United States Patent
Sathaye et al.

(10) Patent No.: US 9,336,363 B2
(45) Date of Patent: May 10, 2016

(54) METHOD AND SYSTEM FOR SECURE DEPLOYMENT OF INFORMATION TECHNOLOGY (IT) SOLUTIONS IN UNTRUSTED ENVIRONMENTS

(71) Applicant: Cofactor Computing LLC, Austin, TX (US)

(72) Inventors: Sumedh Wasudeo Sathaye, Austin, TX (US); Nitin Sadashiv Deshmukh, Mumbai (IN)

(73) Assignee: Cofactor Computing LLC, Austin, TX (US)

(*) Notice: Subject to any disclaimer, the term of this patent is extended or adjusted under 35 U.S.C. 154(b) by 87 days.

(21) Appl. No.: 14/160,539

(22) Filed: Jan. 21, 2014

(65) Prior Publication Data

US 2015/0205939 A1    Jul. 23, 2015

(51) Int. Cl.

| | |
|---|---|
| *G06F 21/00* | (2013.01) |
| *G06F 21/10* | (2013.01) |
| *H04L 9/14* | (2006.01) |
| *G06F 21/62* | (2013.01) |
| *G06F 21/60* | (2013.01) |
| *H04L 9/08* | (2006.01) |
| *H04L 29/06* | (2006.01) |

(52) U.S. Cl.
CPC ............... *G06F 21/10* (2013.01); *G06F 21/60* (2013.01); *G06F 21/62* (2013.01); *H04L 9/085* (2013.01); *H04L 9/0894* (2013.01); *H04L 9/14* (2013.01); *G06F 2221/07* (2013.01); *H04L 63/0428* (2013.01)

(58) Field of Classification Search
CPC ................... G06F 2211/007; G06F 2221/2109
USPC ............ 713/164–167, 189–194; 380/258–30; 707/640–653, 661–686
See application file for complete search history.

(56) References Cited

U.S. PATENT DOCUMENTS

| | | | |
|---|---|---|---|
| 5,241,597 | A | 8/1993 | Bright |
| 7,073,065 | B2 | 7/2006 | Stone |
| 7,120,696 | B1 * | 10/2006 | Au et al. .................. 709/229 |
| 7,234,057 | B2 | 6/2007 | Park |
| 7,337,331 | B2 * | 2/2008 | Yoshida .................. 713/193 |
| 8,140,848 | B2 | 3/2012 | Brundage et al. |

(Continued)

OTHER PUBLICATIONS

Backes, Michael, Birgit Pfitzmann, and Michael Waidner. "A composable cryptographic library with nested operations." Proceedings of the 10th ACM conference on Computer and communications security. ACM, 2003.*

*Primary Examiner* — Madhuri Herzog
(74) *Attorney, Agent, or Firm* — Forefront IP Lawgroup, pllc

(57) ABSTRACT

Described herein are techniques related to shielding data, thereby enabling the shielded data to be distributively placed in untrusted computing environments for cost effective storage. A method and system may include a trusted agent operable in a trusted computing environment. The trusted agent includes a transformation knowledge key generator and a data transformer. The transformation knowledge key generator is operable to generate a transformation knowledge key, the transformation knowledge key being generated with at least two shielding algorithms to shield the data. The data transformer is operable to transform the data into N segments of shielded data using the transformation knowledge key. A communications agent securely coupled to the trusted agent is operable to securely transfer one or more of the N segments of shielded data to one or more storage devices in untrusted computing environments.

38 Claims, 16 Drawing Sheets

(56) References Cited

U.S. PATENT DOCUMENTS

| | | |
|---|---|---|
| 8,429,420 B1 | 4/2013 | Melvin |
| 8,504,847 B2 * | 8/2013 | Resch et al. ............. 713/193 |
| 8,732,479 B1 * | 5/2014 | Henriksen et al. ........... 713/189 |
| 2003/0223580 A1 | 12/2003 | Snell |
| 2006/0147041 A1 | 7/2006 | Claret et al. |
| 2007/0154018 A1 * | 7/2007 | Watanabe .................... 380/273 |
| 2010/0008509 A1 * | 1/2010 | Matsushita et al. .......... 380/279 |
| 2010/0268966 A1 * | 10/2010 | Leggette et al. ............. 713/193 |
| 2010/0313036 A1 * | 12/2010 | Lumb .......................... 713/189 |
| 2011/0202755 A1 | 8/2011 | Orsini et al. |
| 2012/0089885 A1 | 4/2012 | Grube et al. |
| 2013/0152160 A1 * | 6/2013 | Smith .................. G06F 21/604 726/1 |
| 2014/0013112 A1 * | 1/2014 | Cidon et al. ................. 713/165 |
| 2015/0149785 A1 | 5/2015 | Pickering et al. |
| 2015/0207625 A1 | 7/2015 | Sathaye et al. |

\* cited by examiner

1092

| NO. | OPERATOR TYPE | SUB-TYPE | PARAMETER | EXAMPLE |
|---|---|---|---|---|
| 1.1 | ENCRYPT (K) 1050 | SYMMETRIC | KEY-LENGTH, KEY | |
| 1.2 | | ASYMMETRIC | KEY-LENGTH, KEY-PAIR | |
| 2.1 | NOISE (N) 1060 | TOGGLE | BIT-GROUP, BIT-SELECTOR-MASK, | TOGGLE ALL/ODD/EVEN BITS, TOGGLE LOW/HIGH/MID NIBBLE, TOGGLE BITS 0167/0145/2367 |
| 2.2 | | SWAP | TRANSPARENT /MIRROR INTER-BYTE / INTRA-BYTE POSITION-SELECTOR | SWAP NIBBLE (7654:3210) SWAP INTER-NIBBLE (76:54,32:10) SWAP ADJACENT-BITS (7:6,5:4,3:2,1:0) SWAP CROSS NIBBLES SWAP ALTERNATE BYTES SWAP CHUNKS OF N-BYTES MIRROR NIBBLE (7654:0123) MIRROR INTER-NIBBLE (76:45,32:01) MIRROR BYTES W.R.T. MID-BYTE MIRROR AT EVERY STEP OF P |
| 2.3 | | ROTATE | LEFT/RIGHT/UP/DOWN, BYTE-CHUNK-SIZE N-BITS | ROTATE LEFT 3 TIMES OF 4-BYTE CHUNK ROTATE UPWARD 2 TIMES OF 6 BYTE CHUNK ROTATE DOWN 4 TIMES OF 10 BYTE CHUNK ROTATE ODD-BYTES 2 TIMES LEFT AND EVEN-BYTES 3-TIMES RIGHT ROTATE UP HIGH-NIBBLE TWICE OF 5-BYTE CHUNK |
| 2.4 | | XOR | KEY, BYTE-CHUNK-SIZE POSITION-SELECTOR | XOR ALL BYTES WITH KEY XOR 4-BYTE CHUNK WITH KEY AND KEY ROTATED LEFT 1-TIME FOR NEXT CHUNK XOR FIRST 8-BYTE CHUNK WITH KEY AND RESULT IS USED AS A KEY FOR NEXT CHUNK XOR 4-BYTE CHUNKS AT ODD POSITIONS |
| 3.1 | ORDER (O) 1080 | - | CHUNK-SIZE, SEQUENCE-CODE | ORDER 7-BYTE CHUNK BY BIG-ENDIAN ORDER 6-BYTE CHUNK BY SEQ:301245 FOR CHUNK-SIZE OF P, SEQUENCE CODE HAS P! PERMUTATIONS |
| 4.1 | SPLIT (S) 1070 | - | N-SEGMENTS, PROPORTION, | SPLIT INTO 5/95 FROM TOP SPLIT INTO 10/90, CUT AT OFFSET |

METHOD AND SYSTEM FOR SECURE DEPLOYMENT OF INFORMATION TECHNOLOGY (IT) SOLUTIONS IN UNTRUSTED ENVIRONMENTS

CROSS REFERENCE TO RELATED APPLICATIONS

The following related and concurrently filed patent application is hereby incorporated by reference:

U.S. patent application Ser. No. 14/160,531, filed concurrently, entitled METHOD AND SYSTEM FOR SHIELDING DATA IN UNTRUSTED ENVIRONMENTS and filed by Sumedh Wasudeo Sathaye and Nitin Sadashiv Deshmukh.

BACKGROUND

An information technology (IT) solution typically includes software, hardware, and service components or a combination thereof that work cooperatively to solve a specific problem or address a user need. Recently, technologies have arisen that allow Cloud service providers (CSP's) to offer cost-effective IT products and services such as virtualized, scalable data centers, unlimited range of applications, platforms and storage technologies, and others for a per use fee or a flat fee. As a result, many of these CSP's offer cost-effective outsourcing of IT operations to an enterprise that may be scaled instantly, seamlessly and on demand in a Cloud computing environment.

A typical in-house IT data center operates in a trusted and controlled environment. However, it may not be as cost-effective as CSP service and may not be easily scalable. Accordingly, there is a need for developing methods and systems for deploying secure IT solutions in a Cloud based unsecure environment.

BRIEF DESCRIPTION OF THE DRAWINGS

FIG. 10B illustrates in tabular form examples of shielding methods included in a library of shielding algorithms.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc., for deployment of IT solutions in untrusted environments.

Example System for Using a Transformation Knowledge Key Used to Shield Data

Figure 1:
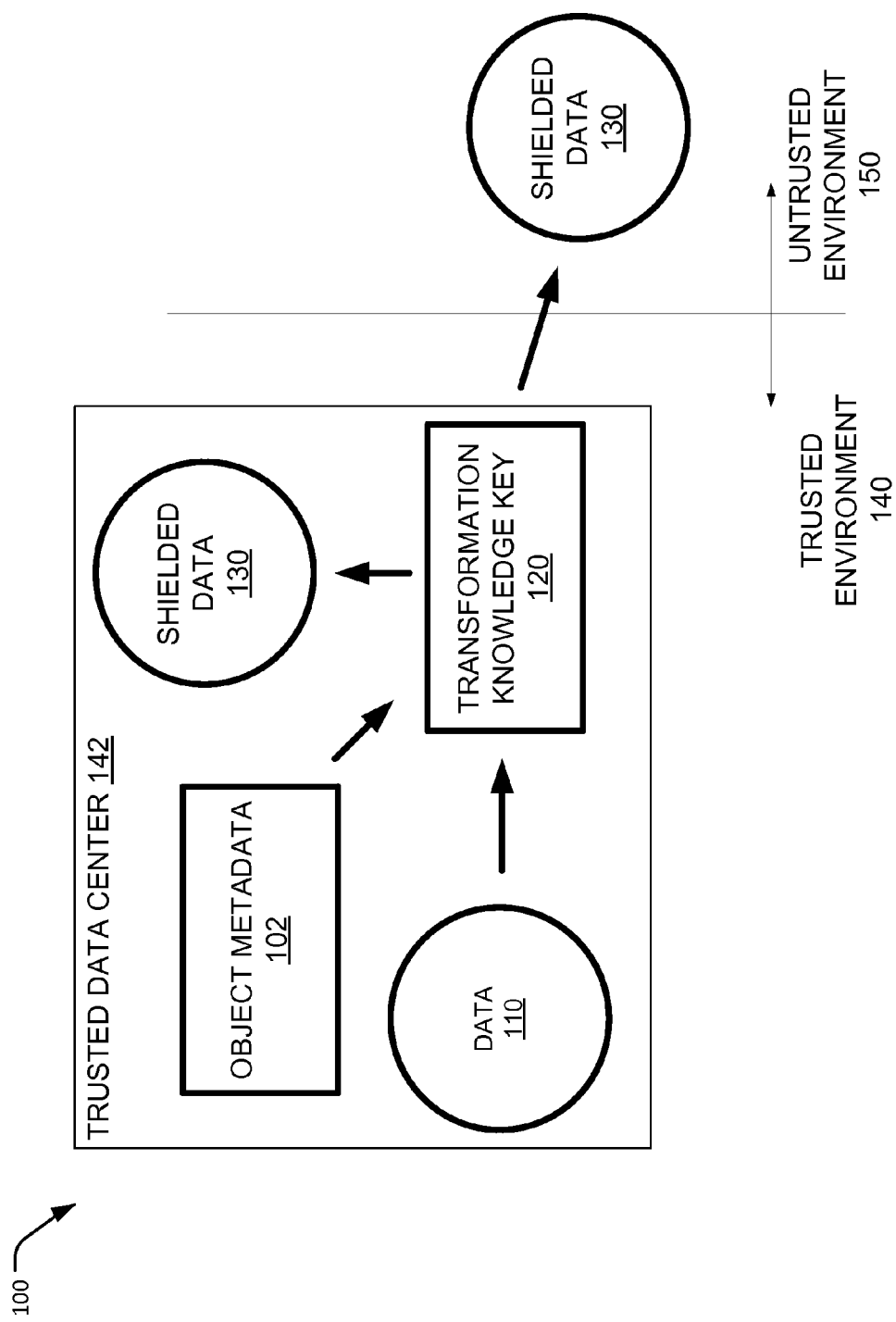
FIG. 1 illustrates a system for using a transformation knowledge key to shield data.

FIG. 1 illustrates an example of a system 100 for using a transformation knowledge key to shield data. In the context of IT solutions and as described herein, data 110 refers to any information processed or accessed by a processor. In its most basic form, data no may be binary and represented by bits (logical 0's and 1's). In addition to binary data, other types of data may include text, numeric, images, audio, video, objects, time, and numerous others. In many IT solutions, data owners may have a need to protect or shield the data 110 representing personal, sensitive, confidential, or trade secret information. Examples of IT solutions that may benefit from shielded data being stored in untrusted environments may include financial applications (e.g., banks, credit cards, equity markets, and others), healthcare applications (patient records, insurance, providers, employers, and others), corporate applications (confidential financial, legal, product related data), government applications (taxes, social security, defense, homeland security), and personal data applications.

Depending on the IT solution, the data no may originate and be stored in a trusted computing environment 140 (may also be referred to as a trusted environment) or may originate and be stored in an untrusted computing environment 150 (may also be referred to as an untrusted environment or a cloud environment). A trusted data center 142 may include one or more computing resources (not shown) residing in the trusted computing environment 140 that are configured to deliver IT solutions. An entity that owns or operates the data center 142 may assign an administrator to maintain complete control over the IT related processes and data.

In an implementation, additional characteristics of the trusted computing environment 140 may include: 1) ability to locate data and computation at all times (e.g., identify the physical location of all data and computation that is located in the trusted data center 142), 2) ability to configure dedicated computing resources for use by trusted users (e.g., configure resources such as physical storage devices, central processing units, physical network connections for internal use only and not shared with any user outside of the organization), 3) control of services provided via a set of request/response protocols offered to trusted users, 4) such that an administrator has full control over deployment of resources (e.g., space, power, physical security, heating/cooling, distribute computing, software and others).

In an implementation, additional characteristics of the untrusted computing environment 150 may include: 1) sharing of resources with third parties (e.g., parties external to the entity that owns the data 110) that typically provide lower costs and improved scalability, 2) ability to configure computing resources needed for use in a shared environment is controlled in real-time by a third party (e.g., a cloud services provider or a virtual private data center may dynamically re-allocate computing resources from one end user to another as needed), 3) control of services provided is via a published set of request/response protocols offered to any paid user, 4) owner or operator of the data 110 has no direct control over deployment of resources (e.g., space, power, physical security, heating/cooling, distribute computing, software and others), 5) multi-tenancy in any untrusted computing environment such as a cloud.

Although no computing environment may be guaranteed to be 100% safe from unwanted attacks at all the time and under any circumstance, an administrator may be able to configure and control a computing environment and designate it to be 'trusted', e.g., create the trusted data center 142 that has an acceptable level of risk in loss of the data no in proportion to the value of the data being shielded.

Although use of encrypted keys to secure data in an untrusted computing environment, e.g., a cloud environment, is well known, the security of the encrypted key used to encrypt the data is becoming increasingly unsafe. Size of the encryption key relative to the size of the data being shielded often becomes a large overhead cost resulting in higher price and lower performance in many IT applications.

In an implementation, a transformation knowledge key 120 may be used to transform the data no into shielded data 130. The shielded data 130 may be stored in the trusted computing environment 140 or the untrusted computing environment 150 in a configurable manner to take advantage of the lower cost options. The transformation knowledge key 120 may be generated with one or more shielding algorithms (not shown) to shield the data. In an implementation, the transformation knowledge key 120 may be represented as a data byte string (not shown).

In an implementation, the transformation knowledge key 120 may be used to shield data at rest (e.g., long term data stored on a hard disc drive or magnetic media), data in motion, flight, or transit (e.g., data being exchanged between or within the trusted environment 140 and the untrusted environment 150), and data in solid state memory (e.g., transient, short term or transaction oriented data that is stored in random access memory). Additional details of techniques to shield data in motion, flight, or transit, and data in solid state memory are described with reference to FIGS. 3 and 4.

An input to generate the transformation knowledge key 120 is data object metadata 102. The data object metadata 102 provides information such as type, size, checksum, access control permissions, and other attributes of the data 110 to be shielded, and policies and parameters in force to manage the data 110. Knowledge about the data object metadata 102 may influence the nature, type, size of the transformation knowledge key 120. Additional details of the transformation knowledge key 120 are described with reference to FIGS. 4 and 5.

It may also be challenging to generate an encryption key that is guaranteed to be 100% safe and secure from unwanted attacks at all the time and under any circumstance. A technique used to generate the transformation knowledge key 120 accepts this risk and mitigates it by dynamically changing the transformation knowledge key 120 in a configurable manner in the trusted computing environment 140. In addition, a unique instance of the transformation knowledge key 120 may be generated for each instance of storage of the shielded data. Thus loss of data due to a compromised instance of the transformation knowledge key 120 may be limited to loss of just one record of the data 110. The techniques and systems described herein generate extraordinary levels of shielding for the data 110, thereby making the data no suitable to be stored in shielded form in the untrusted environment 150 and benefit from the lower cost and improved scalability. Additional details of the transformation knowledge key 120 using one or more shielding algorithms are described with reference to FIGS. 4, 5, 8, and 9.

Figure 2:
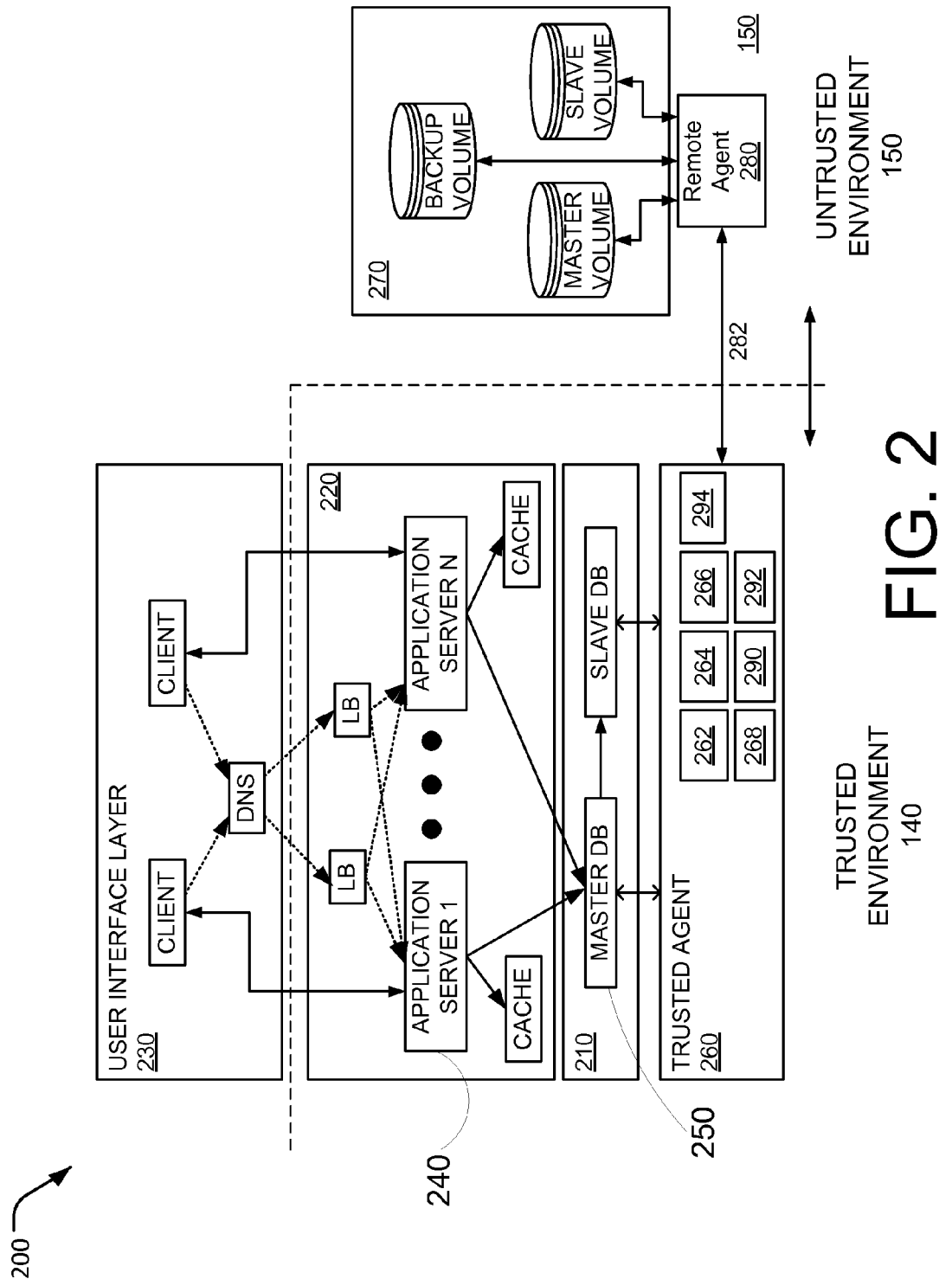
FIG. 2 illustrates an example of a system for storing shielded data in an untrusted environment.

Example of a System for Shielding Data for Storage in Untrusted Computing Environments FIG. 2 illustrates an example of a system 200 for storing shielded data in an untrusted environment.

With continuing reference to FIG. 2, the system 200 illustrates a 3-tier IT solution architecture for storing shielded data in an untrusted environment to reduce costs and improve scalability. In an implementation, the 3-tier architecture may include a database layer 210, an application layer 220, an a user interface layer 230. The database layer 210 is typically a conventional data warehouse that makes use of clustered multi-processor systems configured with high availability/redundancy features such as master/slave storage volumes and back-up/archiving volumes.

The application layer 220 is typically comprised of one or more server computers, e.g., a web application server, and all application related executables reside in this tier. The user interface layer 230 is typically comprised of one or more client computers that may be configured to provide a user interface, e.g., a web browser, to access application features hosted by one or more of the application servers. Thus, the application layer 220 provides an interface between user interface layer 230 and the database layer 210. In an implementation, the application layer 220 may include cache memory to improve performance and support backup functions.

In an implementation, the system 200 is configured to include one or more components of the 3-tier IT solution architecture to exclusively reside in the trusted environment 140. The system 200 includes one or more instances of application servers 240, a database (DB) system 250, and a trusted agent 260 residing in the trusted environment 140. In addition, the system 200 is also configured to include data storage devices 270 and at least one remote agent shown as a remote agent 280 (that is configured as a remote storage agent) residing in the untrusted environment 150. Although at least one instance of the remote agent 280 is shown in the system 200, it is understood that the system 200 may be configured to include more than one instance of the remote agent 280. Similarly, although only one trusted agent 260 is shown, system 200 may be implemented with more than one trusted agents residing in the trusted environment 140. The trusted agent 260 is configured to communicate with the remote agent 280 via a secure communications link 282.

As described herein, the trusted agent 260 and the remote agent 280 may be configured to function as an agent for a user (e.g., entity, administrator, solution provider, data owner, and others) or another program to perform one or more functions in an autonomous and continuous manner. The trusted agent 260 and the remote agent 280 may implemented as hardware, software, firmware, or a combination thereof. In an implementation, the remote agent 280 is configured as a storage agent that is coupled to the data storage devices 270. The remote agent 280 may also be configured to perform additional functions that are described with reference to FIG. 3.

In an implementation, the trusted agent 260 includes at least one instance of the following components: a server 262, a data storage drive (referred to as a 'drive') 264, a database 266, a configurator 268, an administration module 290, and a policy engine 292.

The server 262 is the main engine of the system 200. It is configured to provide various services to other components included in the system 200. The services may be subscribed to and/or access via published APIs. The server 262 may be made available as a standalone process, a daemon, a dynamically linked library, a shared library, or it may be included and made part of other IT solution computation components.

The drive 264 provides shared storage services to components of the system 200 via the server 262. That is, system 200 components may read or write data to the drive 264 as if it is a direct access storage device (e.g., a hard disk). Services provided by the drive 264 may be exposed to the operating system (OS) via a device driver interface.

The database 266 is a private database designed to hold any and all information pertinent to storage function(s) in the system 200. For each piece of the data 110 to be shielded representing each instance of storage, the database 266 holds a unique handle, and a unique instance of the transformation knowledge key 120. It holds the knowledge (e.g., in the form of configuration data, logic, rules, objects, procedures, and others) of various locations (e.g., at the remote agent 280) which one or more segments of the shielded data 130 are stored. The database 266 also holds policies that control the behavior of each instance of storage, via execution in the policy engine 292. The database 266 also holds storage configuration information and parameter values. The database 266 may also hold user access and other privilege information such as credentials to access untrusted zone storage elements.

The policy engine 292 is operable to read, interpret, hold, and apply behavioral policies for the entire system 200. The policies (e.g., configured as rules) may be specified in a textual or other representations. The policies may be configured via several different methods, e.g. via uploaded policy files, or via using graphical user interfaces. The policy engine 292 may provide a policy capture feature that combines the configuration, administration, and policy capture functions that reside in and is accessible only from the trusted computing environment 140. In an implementation, only the server 262 may be accessible from outside of the trusted computing environment 140. As described earlier, services provided by the server 262 may be subscribed to and/or accessed via published API's.

The configurator 268 is a module that enables allows an IT solution provider or an administrator to specify the configuration parameters for the system 200. The administration module 290 enables an authorized user or administrator to perform administration functions such as access control, user add/remove/modify, plot trends of data access, and others. Other functions may include: (1) cost monitoring, (2) alarms & indicators, (3) event logging and action triggers, (4) co-ordination between system 200 instances residing in other trusted environments, and (5) data replication across other system 200 instances residing in other trusted environments. In an implementation, the configurator 268 may include multiple instances of system 200 instances to serve a single IT solution. Examples of configuration data controlled by the configuration module 268 may include: data storage locations, the control & scaling parameters that affect the behavior of solution on the untrusted environment 150, and others.

In an implementation, a data visualization (DV) agent 294 may be configured to enable a data owner, an authorized user, or an administrator to visualize the physical locations of all shielded data that may be deployed in the IT solution including shielded data in the trusted environment 140, the untrusted environment 150 or a combination thereof. Thus, the DV agent 294 may be configured to extend the amount of control the data owner, an authorized user, or an administrator may be able to exert on the shielded data by being able to pinpoint data locations on demand or displayed in real-time as a part of system monitoring function. The system monitoring function may include issuing alarms or alert messages when an unauthorized access to the shielded data 130 is detected. The DV agent 294, which is a component of the trusted agent 260, may be configured to be accessible only from the trusted environment 140.

In an implementation, the remote agent 280, which is configured as a remote storage agent, may act on two types of commands received from the server 262: (1) store commands, and (2) retrieve commands. The store commands include instructions for the remote agent 280 to store one or more segments of the shielded data 130. The remote agent 280 is configured to execute the instructions, resulting in storage of the shielded data 130 in the untrusted computing environment 150. The remote agent 280 may be configured to associate a unique identifier handle (e.g. a text string) with each segment of the shielded data 130. If asked to do so, the remote agent 280 returns the value of the identifier to the server 262, which may store it in the database 266.

With the retrieve commands, the remote agent 280 receives one or more identifier handles from the server 262. In response, remote agent 280 retrieves the associated segments of the shielded data 130 stored in the untrusted computing environment 150, and transfers them to the server 262 via communications link 282.

In an implementation, the trusted agent 260 may also include additional agents (not shown) such as: 1) an agent to keep track of user and application identities encoded in suitable format, 2) user access control agent that serves as a single authentication, and authorization mechanism for requests to access agents residing in the untrusted environment 150 and solution elements, 3) data transformer that transforms the data 110 in to the shielded data 130, 4) transformation knowledge key generator that generates the transformation knowledge key 120, 5) compliance and monitoring agent, and a communications agent to handle secure communications in trusted as well as untrusted environments. Additional details about the data transformer and the transformation knowledge key generator are described with reference to FIGS. 4 and 5.

It is understood that, depending on an application specification, a multi-tier IT solution architecture for shielding data may include more than 3-layers, e.g., a 5-layer IT solution. Conversely, it may implement it as a single layer IT solution.

Figure 3:
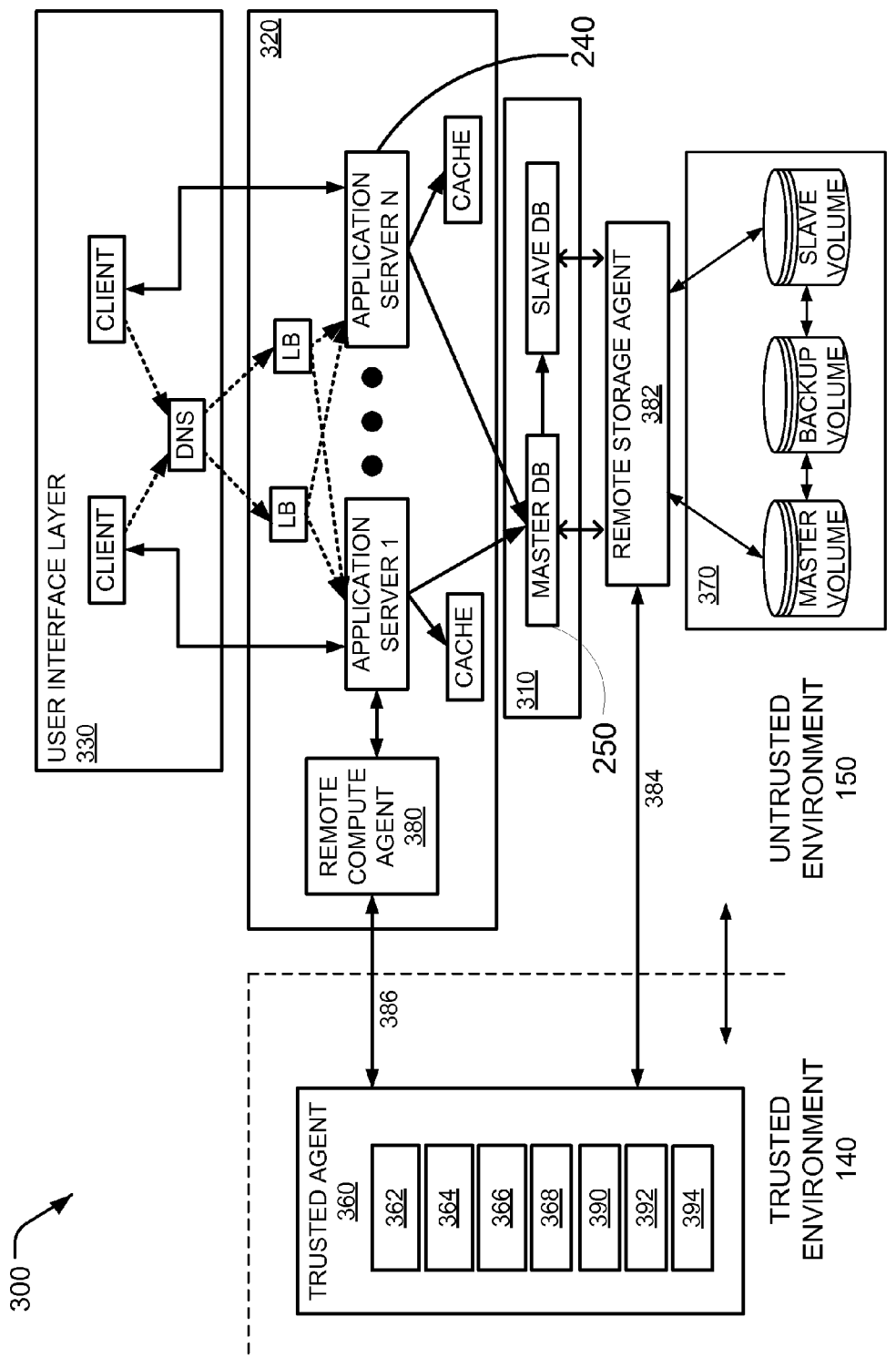
FIG. 3 illustrates an example of a system for deployment of computation and storage of data in an untrusted environment.

Example of a System for Shielding Data for Storage and Computation in Untrusted Computing Environments FIG. 3 illustrates an example of a system 300 for deployment of computation and storage of data in an untrusted environment. In an implementation, an entity may opt to not only distribute the shielded data 130 to reside in the untrusted computing environment 150 but the entity may also opt to distribute some of the computational functionality of the IT solution to further reduce costs and improve scalability.

In an implementation, the system 300 is configured to include one or more components of the 3-tier IT solution architecture including a database layer 310, an application layer 320, an user interface layer 330 to exclusively reside in the untrusted environment 150 and the trusted agent 360 to reside exclusively in the trusted environment 140. The system 300 includes one or more application severs 362, a database (DB) system 364, an instance of the remote agent 180 configured as a remote compute agent 380 and an instance of the remote agent 180 configured as a remote storage agent 382. In addition, the system 300 is also configured to include data storage devices 370 coupled to the remote storage agent 382 residing in the untrusted environment 150.

The trusted agent 360 is configured to communicate with the remote storage agent 382 via a secure communications link 384 and with the remote compute agent 380 via a secure communications link 386. Although only one instance of the remote storage agent 382 and the remote compute agent 380 is shown in the system 300, it is understood that the system 300 may be configured to include more than one instance of the remote agents 280, 380, 382.

In an implementation, the trusted agent 360 is substantially similar to the trusted agent 260 described with reference to FIG. 2. Referring back to FIG. 3, similar to the trusted agent 260, the trusted agent 360 may include at least one instance of the following components: a server 362, a drive 364, a database 366, a configurator 368, an administration module 390, and a policy engine 392, a DV agent 394. Each component of the trusted agent 360 provides similar functionality and services as those provided by corresponding components of the trusted agent 260 described with reference to FIG. 2. In addition, the trusted agent 360 is configured to delegate some computational functions (e.g., related to client or user transactions) to the remote compute agent 380 for execution in the untrusted environment 150, thereby reducing costs and improving scalability.

The remote compute agent 380 may be configured as a single-purpose agent, or a unified multi-purpose super-agent performing functions complementary to that supported by the trusted agent 360. The IT solution and the underlying platform typically communicate with each other via well-known OS calls, e.g., disk file read/modify/delete, or network socket communications. The remote agent 380 may be configured to either (1) intercept the calls/communication between different layers of the IT solution, e.g., between the application server 240 and the database 210, or, (2) the application server 240 and/or the database 210 may be "aware", e.g., be explicitly configured to send all their communications through the remote compute agent 380. The remote compute agent 380 may communicate via a protocol well-understood by the application layer, and the database layer, and the related parts of the IT solution e.g. the data caching devices associated with the application layer. The one or more communication channels between these entities are built with well-known and understood secure tunnels e.g. openssl tunnels, HTTP Secure tunnels, and similar others.

The remote compute agent 380 may include an instance of the policy engine agent 392, which co-operating with the policy engine agent 392 holds, serves, and applies policies (rules) which control behavior of various parts of the platform apparatus residing in the untrusted environment 150. In an implementation, the remote compute agent 380 is operable to receive transformation logic data, e.g., a code dictionary, a set of code interpretation rules, and other, to interpret the transformation knowledge key 120, and the transformation knowledge key 120 itself. As described herein, the transformation logic data may include data associated with reconstruction of the data 110 from the shielded data, or rules or logic associated with the policy engine agent 392, and policies (rules) that may be used to unshield the data 110 using the transformation knowledge key 120. In an implementation, the trusted agent 360 sends transformation logic data to the remote agent 380 to interpret the transformation knowledge key 120 and the transformation knowledge key itself.

Encoded in the policies, the remote agent 380 may be instructed to intercept specific data requested by the solution application, e.g., lookup of user directory during the authentication step of the IT solution. Upon matching intercepts, the remote agent 380 may execute actions specified in the policy. In an implementation, the actions may be as follows: (1) send a data lookup request to the trusted agent 360 using a handle (e.g., a user login name), (2a) receive unshielded response data to pass along to the application server that requested it, or (2b) receive shielded data+transformation knowledge key 120 to be used to unshield the data 110, which then will be passed along to the application server that requested it. Several types of data intercept, request, receive, use may be encoded in the policy engine 392. The interception of requests may be explicit (e.g. the application server is "aware" of these extra steps, or implicit (the application server speaks the regular API for access of these data which is converted into the intercept, request, receive use sequence by agent 380.

As described with reference to FIG. 1, the data 110 may originate in the trusted environment 140 or the untrusted environment 150. For example, in an IT solution for the insurance marketplace, a user operating in the user interface layer 330 may enter new insurance policy data on their web browser accessing a web site supported by the application layer 320. The new insurance policy data, which originates in the untrusted environment 150, may be transferred by the application server to the remote compute agent 380 to the trusted agent 360 for data transformation and storage.

Example of a System to Generate a Transformation Knowledge Key

Figure 4:
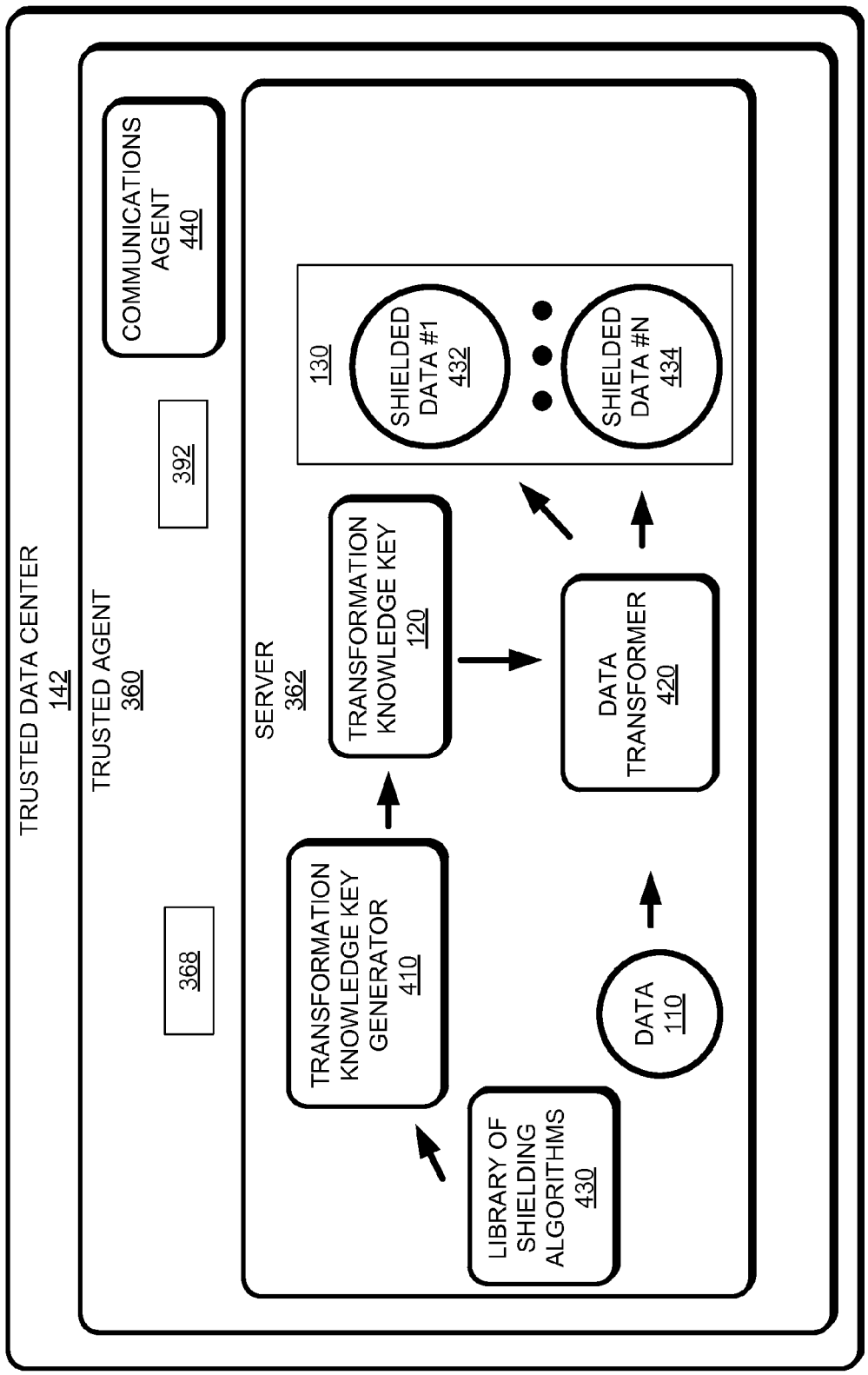
FIG. 4 illustrates components in a server that are configured to generate one or more instances of a transformation knowledge key.

Referring to FIGS. 3 and 4, illustrated are components in the server 362 that are configured to generate one or more instances of the transformation knowledge key 120. A data transformer 420 is operable to use the transformation knowledge key 120 to transform the data no into the shielded data 130. In an implementation, the shielded data 130 may be further shielded by splitting it into N segments of shielded data (432, 434), where N is a positive integer using the transformation knowledge key 120. In an implementation, the at least one segment of the shielded data is the shielded data 130 and the N segments of shielded data (432, 434) may be represented as the N sub-segments of the at least one segment of the shielded data. Thus, a unique instance of the transformation knowledge key 120 may be used for each instance of data transformation of the data no to the shielded data 130. In an implementation, one or more instances of the transformation knowledge key 120 may be configured to be identical. In an implementation, one instance of the transformation knowledge key 120 may be the assigned to a client or an application requesting the trusted agent 360 to shield the data 110 or reconstruct the shielded data 130.

A transformation knowledge key generator 410 is operable to select at least two shielding algorithms (not shown) that are stored in a library of shielding algorithms 430 to generate one or more instances of the transformation knowledge key 120. In general, a greater level of shielding protection for the data 110 may be achieved by selecting more than 2 shielding algorithms but additional compute power may be needed. The transformation knowledge key generator 410 combines knowledge (in the form of configuration data, logic, rules, objects, procedures, and others) from the library of shielding algorithms 430, the policy engine 392 and the configurator 368 to generate the transformation knowledge key 120. A communications agent 440 residing in the trusted environment 140 may be configured to communicate information with other computing devices via the communications link 282.

In an implementation, to improve shielding of data in motion, flight or in transit, the communications agent 440 may be configured to establish N concurrently operable secure channels of communications (e.g., using openssl tunnels) via the communications links 386, 384 with one or more remote agents (e.g., the remote compute agent 380 and the remote storage agent 382), N being a positive integer. The policy engine 392 may be configured to select one or more of the N channels based on factors such as response time, latency, security of channel, and others. Thus, the trusted agent 360 and the remote agent 380 may be configured to communicate over more than one simultaneous communication channels so that sensitive data (such as the transformation knowledge key 120 or the data segment itself) can be transferred through untrusted environment 150 (e.g., the Internet) using a configurable split-communication technique. In an implementation, the splitting of the communication messages between N channels may be performed in accordance with one of the shielding algorithms selected from the library of shielding algorithms 430.

In an implementation, the trusted agent 360 and the remote agent 380 may include additional agents (not shown) that may apply the shielding techniques to shield data in transit. These additional agents, when presented with message data, may perform the following: (1) open N simultaneous communication links between them, N being a positive integer, the N links being operable on separate network ports in the respective agents, (2) the sender agent generates an instance of the transformation knowledge key 120 (TKK 120) for the message data, which may be called message TKK, (3) the sender agent applies the message TKK to the message data, (4) the application of the message TKK may transform the message data into one or more message data segments, (5) the sender agent may send the message TKK to the receiver agent on a separate, secure communication channel (e.g. encrypted OpenSSL channel, or a FIPS-148 channel), (6) the sender agent may send the message data segments over the multiple communication channels to the receiver agent, (7) the receiver agent after receiving the message data segments, applies the message TKK in reverse to the message data segments to reconstruct the original message. This implementation may use internal communication links (e.g. message pipes, message queues between processes), or external communication links (e.g. real network links).

In another implementation, the remote compute agent 380 may shield data in main memory of a system operating in the untrusted environment 150. At run time, when presented with data that will exclusively reside in main memory (e.g., in-memory databases, event log buffers, and other), it may request the trusted agent 360 to generate an instance of the transformation knowledge key 120 (TKK 120) for memory storage, e.g., a memory TKK for the data. The memory TKK may be generated for a large piece of data, or, one memory TKK may be generated per data sub-element, e.g., for each element of a data structure. Once the memory TKK's are generated by the trusted agent 360, they may be conveyed to the remote compute agent 380 over a separate, secure channel (e.g. encrypted OpenSSL channel, or a FIPS-148 channel). A data transformer instance in the remote compute agent 380 may then apply the memory TKK to the in-memory data, to shield it. It may then delete the memory TKK. When an application server or any other part of the IT solution stack requests the in-memory data, the data transformer may request the pertinent memory TKK from the trusted agent 360, upon receiving which, may apply it in reverse to unshield the memory data and present it to the requesting part of the IT solution. In another implementation for shielding of in-memory data, one or more IT solution components may be programmed to invoke special data object class implementations (one each for data types, e.g. for integer data, floating-point data, character & string data, array data etc.), which, may (1) request the trusted agent for a memory TKK for the data element, (2) apply the memory TKK to the element and store it in-memory, and (3) on demand, fetch and reverse apply the memory TKK to supply the data element.

Example of a Transformation Knowledge Key

Figure 5:
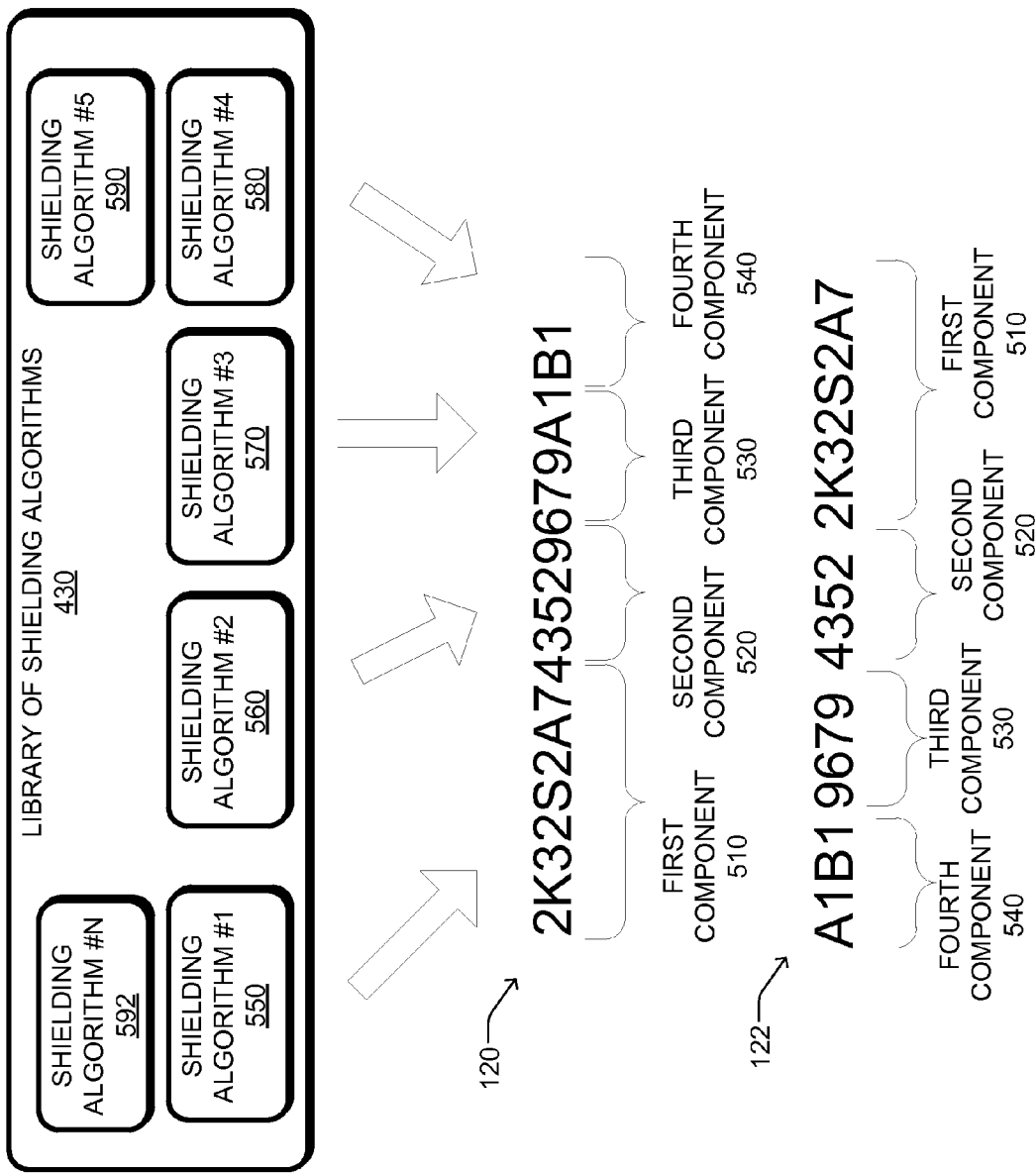
FIG. 5 illustrates a transformation knowledge key.

FIG. 5 illustrates a transformation knowledge key. In an implementation, the transformation knowledge key 120 is a data byte string that may include encoded information used in the data transformation process. In an implementation, the transformation knowledge key 120 may be generated by concatenating a configurable number of components, e.g., a first component 510, a second component 520, a third component 530, and a fourth component 540, into a data byte string. Although 4 components are shown, it is understood that at least two components may be concatenated to generate transformation knowledge key 120. In an implementation, the transformation knowledge key 120 may be generated by concatenating the same component more than once, e.g., the transformation knowledge key 120 may include 5 components (510, 520, 530, 540, 530).

Referring to FIGS. 4 and 5, each component is generated by selecting a shielding algorithm from the library of shielding algorithms 430. For example, the transformation knowledge key generator 410 may generate the first component 510 represented by an N-character code, e.g., 2K32S2A7, N being a positive integer by selecting a first shielding type algorithm 550 and combining knowledge from the policy engine 392 and the configurator 368. Similar procedure may be used by the transformation knowledge key generator 410 to generate the remaining components (520, 530, 540) using shielding algorithms (560, 570, 580) respectively. The number of characters used for encoding each component may vary and be different than or be the same as the N-character code. Additional details of the library of shielding algorithms 430 are described with reference to FIG. 10.

The transformation knowledge key 120 in the form a coded data byte string may be used as a recipe for shielding the data no. In an implementation, the recipe may include coded information in the form of data, instructions, expressions, operations, parameters, methods or procedures for the data transformer 420 to shield the data 110 by transformation.

In an implementation, data transformation or a shielding process implemented in the data transformer 420 may support four transformation operator types—K, N, O and S, (where K, N, O, and S each correspond to one of the library of shielding algorithms 430). Additional details of the K, N, O and S transformation operator types is described with reference to FIGS. 9, 10A, and 10B. Each K, N, O transformation operator type is associated with an input data and an output data, whereas the S transformation operator type is associated one input data and more than one output data. Each transformation operator type may have associated parameters that may specify details of the data transformation process. All data transformations processes are reversible. That is, input data may be reconstructed based on output data for each transformation operator type and the transformation knowledge key 120.

In an implementation each component of the transformation knowledge key 120 may be constructed as a data byte string that may include the following coded information: Transformation Operator Type [Input data descriptor: IP1, Output data descriptor: OP1, Transformation Algorithm Type: P1, Transformation Algorithm Parameter: P2].

In an implementation, a component may be expressed as a transformation expression and may include one or more transformation operator types in the configurable order (e.g., (K, N), (K, N, O, N, S), and others). A first level of transformation expression that operates on the data 110 includes at least two transformation operator types.

In an implementation, the coded data byte string may include nested codes, e.g., in instances when the data 110 is shielded and then split into multiple segments and each segment is shielded further by another separate data transformation. In an implementation, the transformation knowledge key 120 may include a nested instance of another transformation knowledge key (not shown). For example, a splitting algorithm may split data into 2 segments and another splitting algorithm may further split one of the 2 previously split segments into 2 sub-segments. A nested example of a transformation expression may include: (K, N, S ((K1, N1), (K2, N2))). The nesting feature of transformation expression and establishing the configurable order of transformation operators within each transformation expression generates extraordinary shielding protection for the data 110.

The transformation knowledge key 120 is an encoded representation of the transformation expression. The transformation knowledge key 120 is therefore an ordered sequence of operations that are progressively performed by the data transformer 420 for shielding the data 110. Additional details of nested instances of the transformation knowledge key 120 are described with reference to FIG. 9.

The coded information included in the transformation knowledge key 120 may be processed, parsed, interpreted or acted on by the data transformer 420 in the configurable order (or in reverse of the configurable order when reconstructing the data 110 from the shielded data 130). Thus, the code corresponding to each component of the transformation knowledge key 120 is used by the data transformer 420 to transform the data 110 into the shielded data 130 that may be split into N segments of shielded data (432, 434), wherein N is a positive integer.

The order of concatenation of the components to form the transformation knowledge key 120 or another instance 122 of the transformation knowledge key 120 may be configurable and defines the configurable order. For example, the configurable order may be selected to be a forward sequence of the components (e.g., 510, 520, 530, 540), a reverse sequence of the components (e.g., 540, 530, 520, 510) or any other random sequence of the components (e.g., 510, 530, 540, 520). Although the transformation knowledge key 120 is shown to have 4 components, it is understood that systems having a transformation knowledge key having more number of components or less than 4 components but at least two components may be configured.

In an implementation, transformation of the data 130 into N segments of shielded data (432, 434) may be performed in the configurable order of the components of the transformation knowledge key 120. The data transformation may be processed in a cascade arrangement of the components where output of a current component is provided as an input to the next component. For example, a data transformation process for shielding the data 110 using the transformation knowledge key 120 having 4 components (e.g., 510, 520, 530, 540) may include generating partially shielded data (or intermediate data) at the end of processing first 3 of the 4 components and the generating the N segments of shielded data (432, 434) after processing the last component in the configurable order.

In an implementation, the data transformer 420 may perform shielding of the data 110 in a sequence that includes at least 2 selectable components from the 4 components (510, 520, 530, 540) of the transformation knowledge key 120. Additional details of the data transformer 420 using a 2-component and a 4-component cascaded arrangement for shielding the data 110 is described with reference to FIGS. 8 and 9.

Referring back to FIGS. 4 and 5, in response to a request, the data transformer 420 is also operable to gather the N segments of shielded data (432, 434) that may be distributed across one or more remote agents for storage and reconstruct the data 110 from the N segments of shielded data (432, 434) using a corresponding one of the transformation knowledge key 120. That is, the data transformer 420 is also configured to process codes making up the transformation knowledge key 120 in an order that is reverse of the configurable order to reconstruct the data 110 from the N segments of shielded data (432, 434). Additional details of the shielding algorithms and the data transformation process to generate the shielded data 130 and reconstruct the data 110 are described with reference to FIGS. 6-10.

Examples of Deployment of Shielded Data in Untrusted Environment

Figure 6:
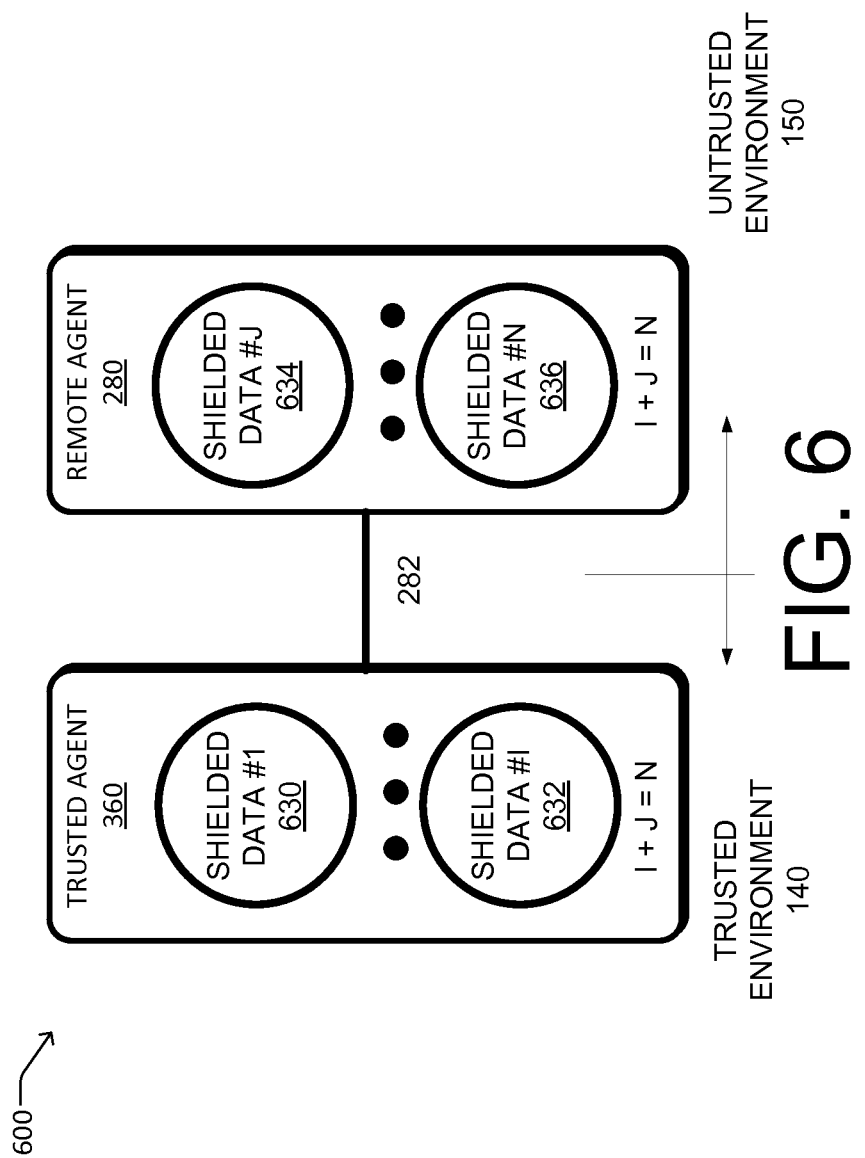
FIG. 6 illustrates a system to deploy shielded data in trusted and untrusted environments.

FIG. 6 illustrates a system to deploy shielded data in trusted and untrusted environments. In an embodiment, the N segments of shielded data (432, 434) may be distributed in accordance with a distribution shielding algorithm (not shown) that is included in the library of shielding algorithms 430. The trusted agent 360 may be configured to store I ones (630, 632) of the N segments of shielded data (432, 434) in the trusted environment 140 and the remote agent 280 may be configured to store J ones (634, 636) of the N segments of the shielded data (432, 434) in the untrusted environment 150, where I+J=N, and where I, and J are non-negative integers. The specific values of I and J selected may depend on the policy and configuration of the distribution shielding algorithm.

In an implementation, the data transformer 420 is operable to reconstruct the data 110 using the transformation knowledge key 120 and data from I ones (630, 632) of the N segments of shielded data (432, 434) stored in the trusted environment 140 and the J ones (634, 636) of the N segments of shielded data (432, 434) received from the remote agent 280 via the communications link 282.

Figure 7:
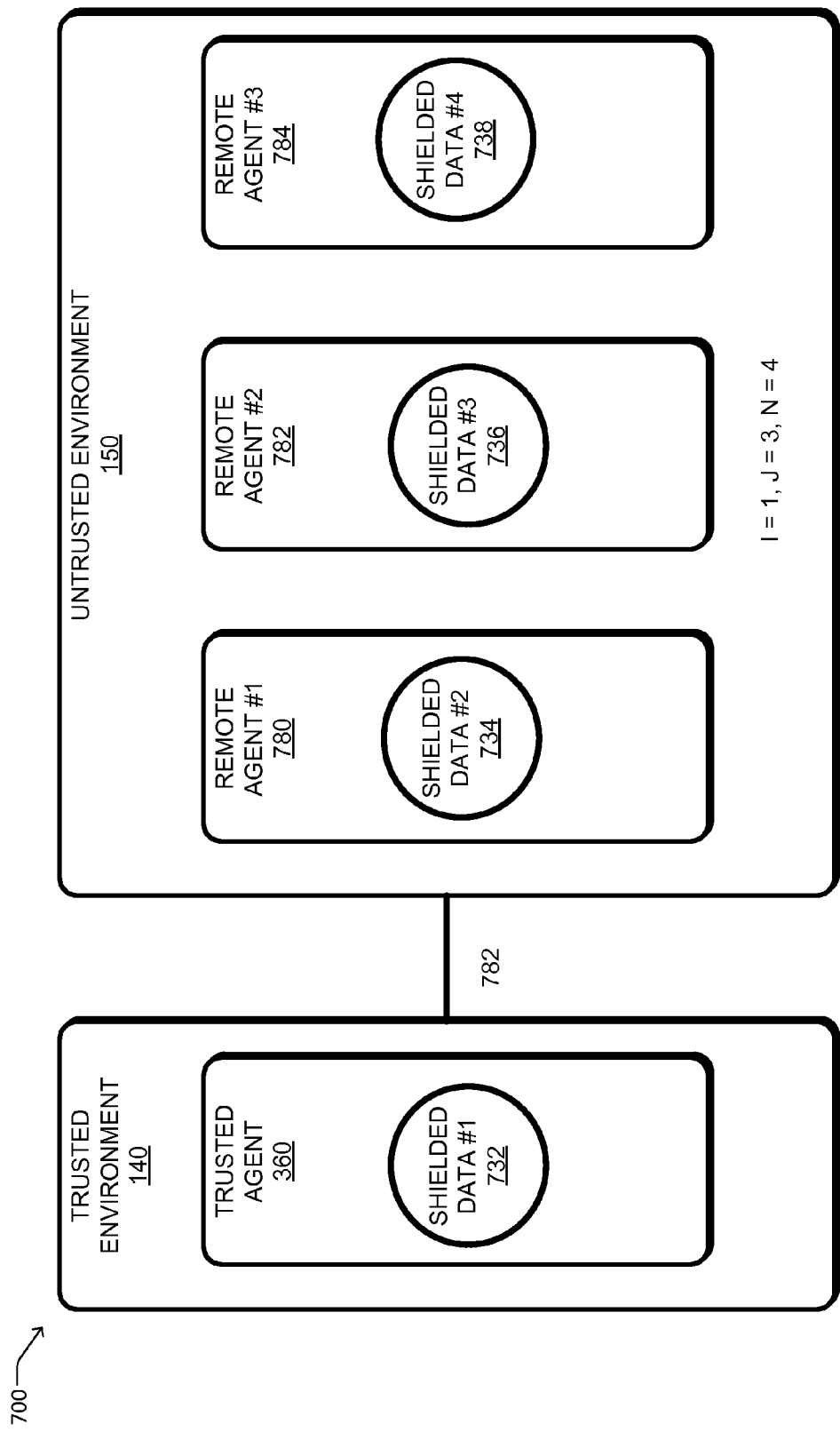
FIG. 7 illustrates a system implemented with a trusted agent and (N–I) remote agents for storing N segments of shielded data.

FIG. 7 illustrates a system 700 implemented with the trusted agent 360 and (N−I) remote agents (780, 782, 784) for storing N segments of shielded data (432, 434). In this example, I=1, J=3, and N=4. That is, the N segments of shielded data (432, 434) include 4 segments, one of the 4 segments is stored in the trusted agent 360, and 3 of the 4 segments are stored in the untrusted environment 150. A first shielded data segment 732 may be stored in the trusted agent 360, and each one of the 3 remote agents (780, 782, 784) may be configured to store a corresponding one of the remaining 3 shielded data segments (734, 736, 738) using the distribution shielding algorithm described with reference to FIG. 6. Referring to FIGS. 6 and 7, in an implementation, the distribution shielding algorithm may be configured to randomize the order of storing the N segments of shielded data (432, 434) by selecting any one the remote agents (780, 782, 784) for storage.

Depending on the distribution policy configured in the policy engine 392, other permutations and combinations of storing the 3 shielded data segments (734, 736, 738) may be possible, e.g., o in the trusted agent 360 and 4 in the 3 remote agents (780, 782, 784) or 2 in the trusted agent 360 and 2 in the 3 remote agents (780, 782, 784), and others. Each one of the 3 remote agents (780, 782, 784) may be configured to store o or more ones of the N segments of shielded data (432, 434) as directed by the trusted agent 360.

Figure 8:
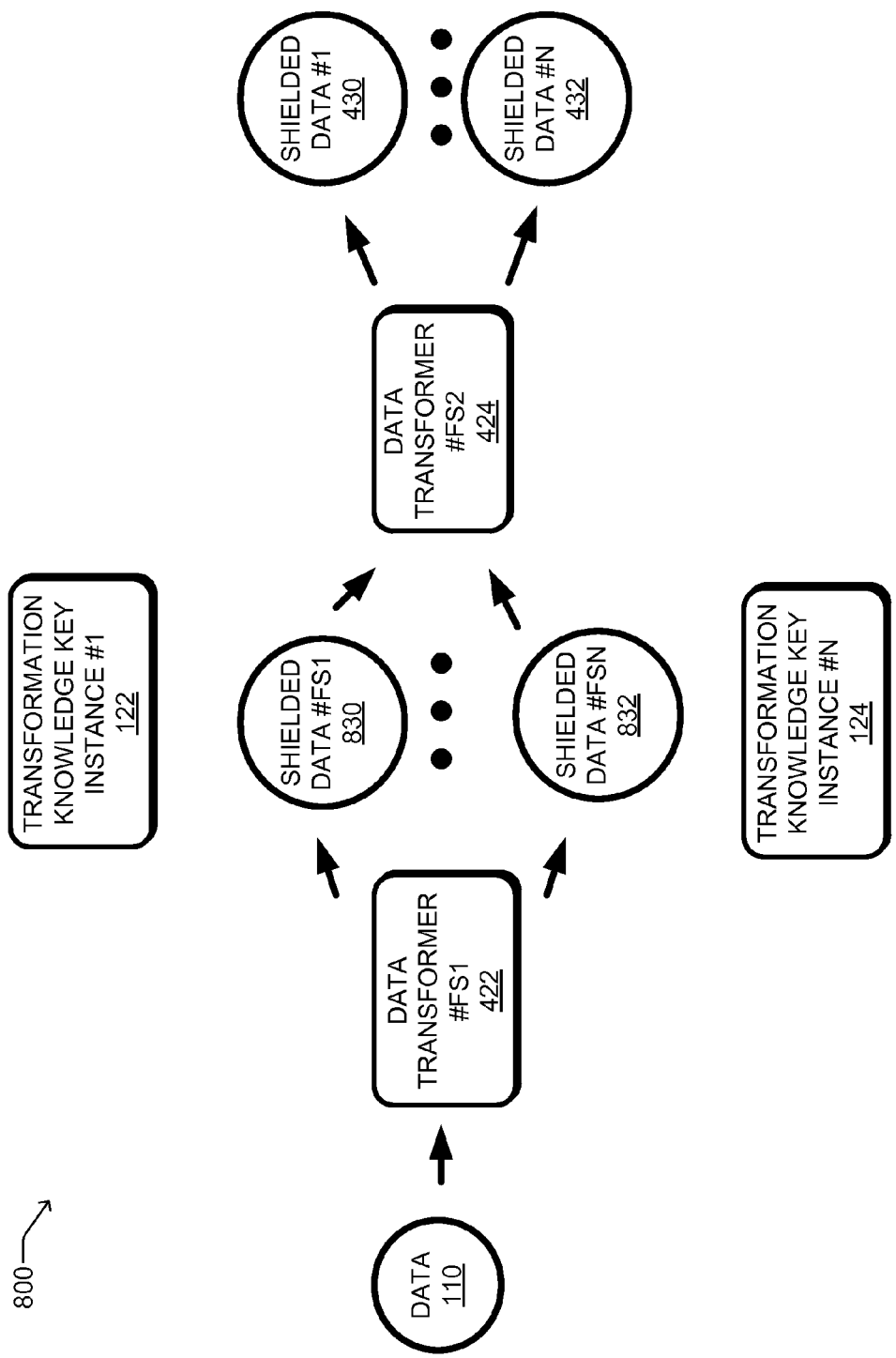
FIG. 8 illustrates a system to shield data into N segments using a 2-component data transformation process.

Example of Data Transformation Process to Transform Data Into Shielded Data Using Two Components FIG. 8 illustrates a system to shield data into N segments using a 2-component data transformation process. In an implementation, system 800 includes the data transformer 420 that is configured to transform data using 2 components that make up the transformation knowledge key 120. The data transformer 420 may be configured to include a first data transformer 422 operable to process codes included in a first one of the two components and a second data transformer 424 operable to process codes included in a second one of the two components. In an implementation, the first component may be configured to include a code to perform a split transformation operation. The splitting operation may be performed in accordance with an N-character code of a component (e.g., first one of 2 components) generated by at least one of the shielding algorithms stored in the library of shielding algorithms 430. Thus, the first data transformer 422 is operable to transform the data 110 by splitting it into N segments of partially shielded data (830, 832) using an instance of the transformation knowledge key 120.

The second data transformer 424 is operable to transform the N segments of partially shielded data (830, 832) into the N segments of shielded data (432, 434) using the transformation knowledge key 120. The data transformation operation may process an M-digit code (M is a positive integer) of a component (e.g., second one of 2 components generated by at least one of the shielding algorithms stored in the library of shielding algorithms 430) to further shield the N segments of partially shielded data (830, 832).

In an implementation, the system 800 may be configured with a single instance of the data transformer 420 that operates on the two components. For example, a first iteration of the data transformer 420 may process the first component and feed the results of the first iteration of data transformation back to its input and apply the second iteration of data transformation to the results, thus achieving the same result as the first and second data transformer (422, 424).

In an implementation, the system 800 may be used to reconstruct the data 110 from the N segments of shielded data (432, 434) using a corresponding instance of the transformation knowledge key 120.

Figure 9:
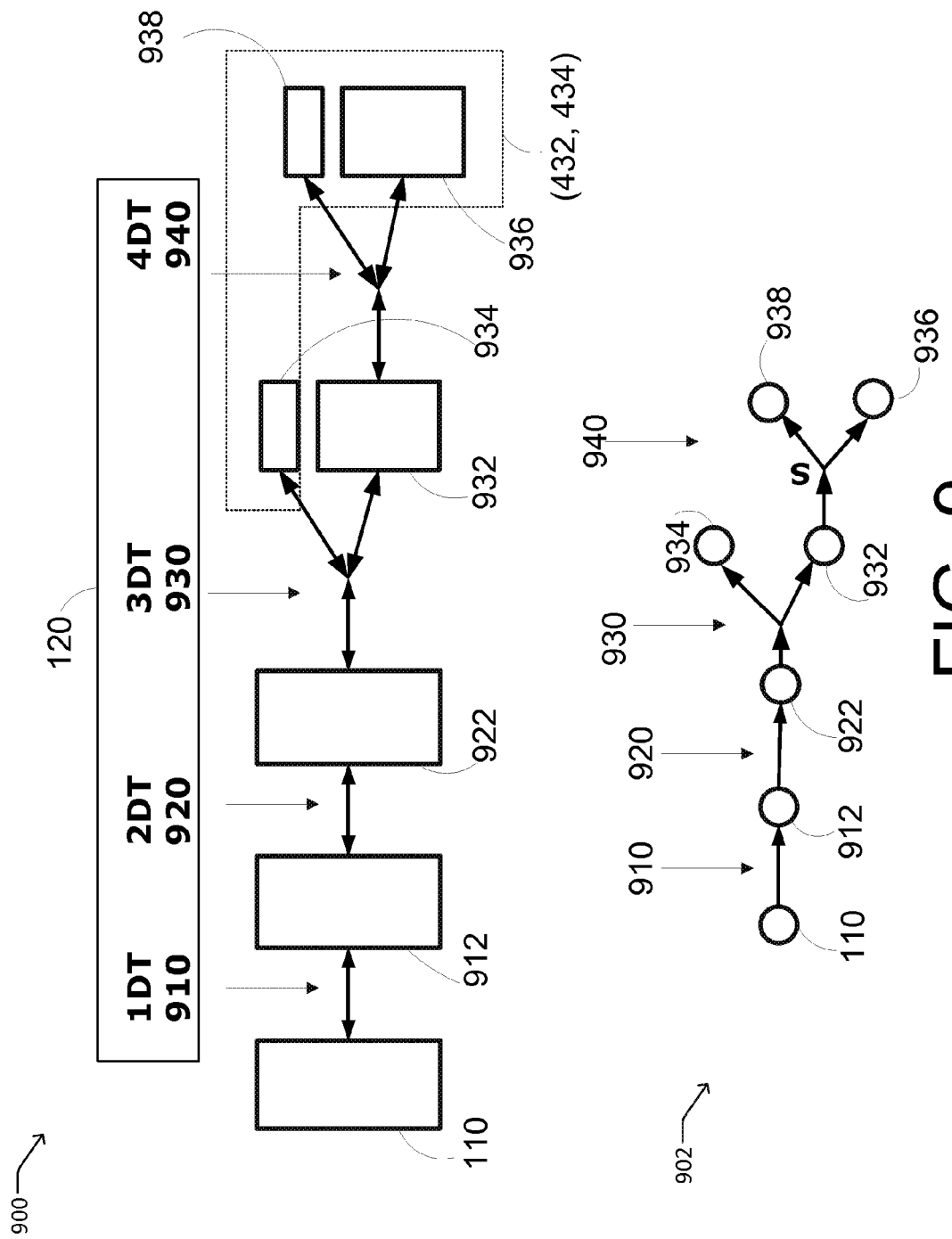
FIG. 9 illustrates a system to shield data into N segments using a 4-component data transformation process.

Example of Data Transformation Process to Transform Data Into Shielded Data Using 4 Components FIG. 9 illustrates a system to shield data into N segments using a 4-component data transformation process. In an implementation, system 900 includes the data transformer 420 that is configured to transform the data 110 in to the N segments of the shielded data (432, 434, shown to include 934, 936, 938) using 4 components (e.g., 510, 520, 530, 540). In this implementation, the transformation knowledge key 120 is configured to include 4 components arranged in the configurable order, as described with reference to FIG. 5.

Referring back to FIG. 9, in an implementation, the data transformer 420 is configured in a cascade arrangement to include a first data transformer (1DT) 910, a second data transformer (2DT) 920, a third data transformer (3DT) 930, and a fourth data transformer (4DT) 940 that are operable to transform data using codes included in the 4 components (e.g., 510, 520, 530, 540) respectively. The 1DT 910 is operable to transform the data 110 in to a first partially shielded data 912 by applying a P-digit code (P is a positive integer) of a component (e.g., first one of 4 components) generated by at least one of the shielding algorithms stored in the library of shielding algorithms 430. The partially shielded output of the 1DT 910 is provided as an input to the next stage, e.g., the 2DT 92 for further shielding.

The 2DT 920 may perform a data transformation operation to generate a second partially shielded data 922 in accordance with an M-digit code (M is a positive integer) of a component (e.g., second one of 4 components) generated by at least one of the shielding algorithms stored in the library of shielding algorithms 430.

In an implementation, the third component (e.g., third one of 4 components) may be configured to include a code to perform a split transformation operation. The splitting operation may be performed in accordance with a P-digit code of the third component generated by at least one of the shielding algorithms stored in the library of shielding algorithms 430. The 3DT 930 is configured to process the splitting operation to further shield the second partially shielded data 922 into a first one of a third partially shielded data 934 and a second one of a third partially shielded data 932.

In an implementation, to increase the level of shielding protection, nested codes may be configured in one or more of the components of the transformation knowledge key 120. In an implementation data byte string may include nested codes that may be configured to include the following information: Transformation Operator Type1 [Input data descriptor: P1, Output data descriptor: P1, {Transformation Operator Type2 (Input data descriptor: P1, Output data: P2, Transformation Algorithm Type: P2A, Transformation Algorithm Parameter: P2P)}, Transformation Algorithm Type: P1A, Transformation Algorithm Parameter: P2A].

The 4DT 940 is operable to perform another splitting operation on the second one of the third partially shielded data 932. Since the splitting operation is not performed on the first one of the third partially shielded data 934, it represents a leaf node or an end node of a configurable order 902. Some data transformation operations may be performed in parallel (e.g., generation of the shielded data points (936, 938). Thus, the N segments of shielded data (432, 434) may be represented as a collection of leaf nodes of the configurable order 902 that includes the first one of the third partially shielded data 934. The second one of the third partially shielded data 932 is split into 2 leaf nodes (936, 938) included in the N segments of shielded data (432, 434). In an implementation, a transformation path from the data 110 to a leaf node, (e.g., 934, 936, or 938) uses an instance of the transformation knowledge key 120.

In an implementation, 1DT 910 may perform data transformation encoded as K(I/P: 110, O/P: 912, Po: AES-Sym, P1: AES-Key), the 2DT 920 may perform data transformation encoded as N(I/P: 912, O/P: 922, Po: Toggle, P1: Odd), the 3DT 930 may perform data transformation encoded as S(I/P: 922, O/P: 934, 932, Po: 7%, P1: @Top), and 4DT 940 may perform data transformation encoded as S(I/P: 932, O/P: 938, 936, Po: XOR, P1: #25). Since O/P: 932 is split for again nested codes may be used and the encoded data byte string representing the transformation knowledge key 120 may be expressed as: [K(I/P: 110, O/P: 912, Po: AES-Sym, P1: AES-Key), N(I/P: 912, O/P: 922, Po: Toggle, P1: Odd), S(I/P: 922, O/P: 934, [S(I/P: 932, O/P: 938, 936, Po: XOR, P1: #25)], Po: 7%, P1: @Top)].

In an implementation, the system 900 may be used to reconstruct the data 110 from the N segments of shielded data (432, 434, shown to include 934, 936, 938) using N corresponding instances (122, 124) of the transformation knowledge key 120.

It is understood that, if the transformation knowledge key 120 is configured to include M components, M being a positive integer, the order of processing the M components to perform the data transformation is forward from left to right as defined in the configurable order. When a splitting component appears, it leads to a nested instance of the transformation knowledge key 120, which is interpreted and applied in exactly the same manner. Similarly, a reverse transformation (e.g., reconstructing or unshielding) is processed from right to left, looking for the first "outermost" component from right, interpreting it, and applying the unshielding transformations specified within. If the "outermost" component is a splitting component, then its nested transformation knowledge key are interpreted first and applied in reverse.

Example of Configuring a Library of Shielding Algorithms

Figure 10A:
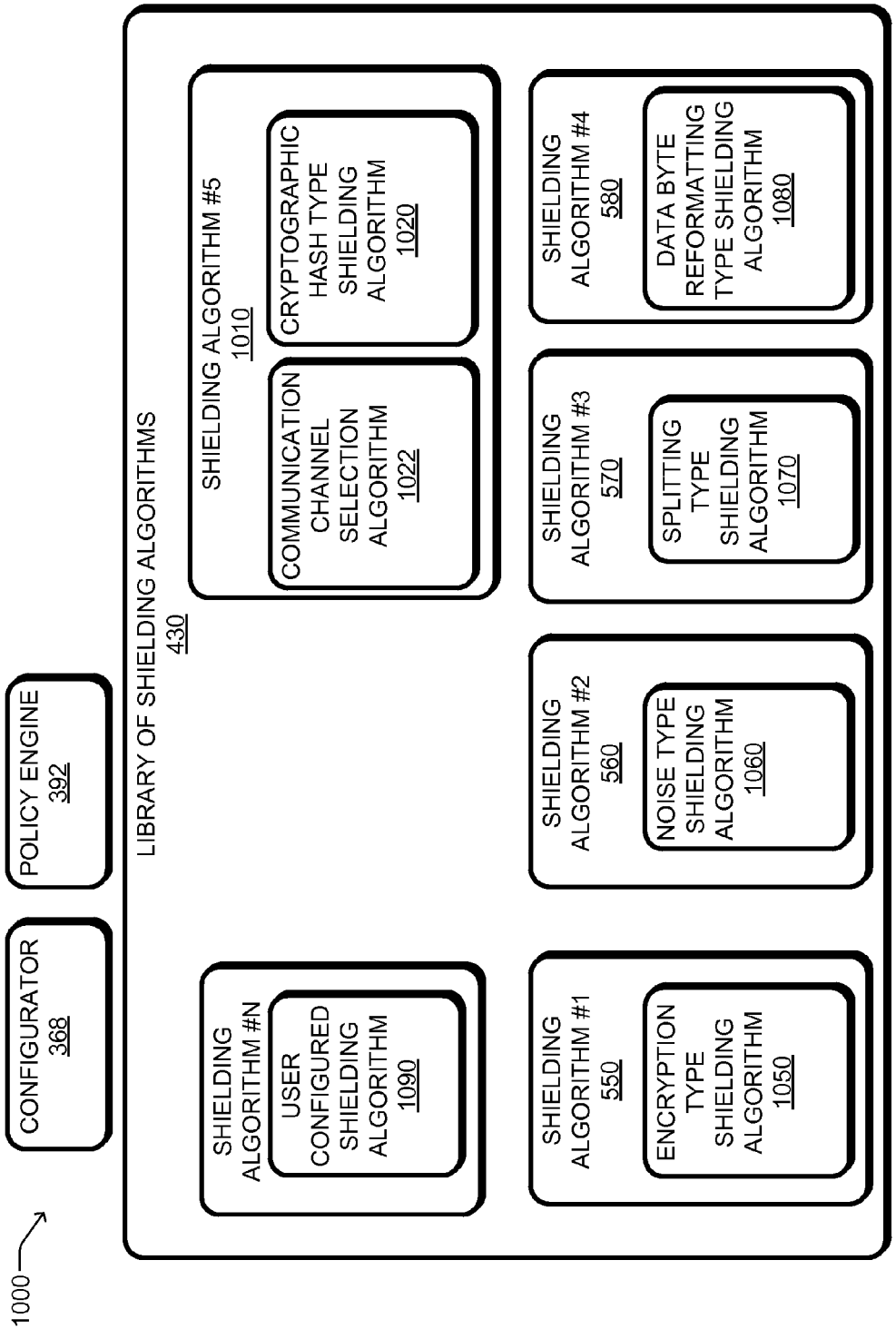
FIG. 10A illustrates a system to configure a library of shielding algorithms.

FIG. 10A illustrates a system to configure a library of shielding algorithms. In an implementation, the system 1000 may be configured to include the library of shielding algorithms 430 working co-operatively with the configurator 368 and the policy engine 392 components of the trusted agent 360. The policy engine 392 and the configurator 368 may be used to build and manage the library of shielding algorithms 430. The library of shielding algorithms 430 may include multiple shielding algorithms (550, 560, 570, 580, 590, 592).

In an implementation, the first shielding algorithm 550 may include an encryption type shielding algorithm 1050 (described earlier with reference to FIG. 5 as a transformation operator type K) that may be configured to generate the first component 510 of the transformation knowledge key 120. The second shielding algorithm 560 may include a noise insertion type algorithm 1060 (described earlier with reference to FIG. 5 as a transformation operator type N) configured to generate the second component 520 of the transformation knowledge key 120. The third shielding algorithm 570 may include a data splitting type algorithm 1070 (described earlier with reference to FIG. 5 as a transformation operator type S) configured to generate the third component 530 of the transformation knowledge key 120. The fourth shielding algorithm 580 may include the data byte reformatting type algorithm 1080 (described earlier with reference to FIG. 5 as a transformation operator type O) configured to generate the fourth component 540 of the transformation knowledge key 120.

In an implementation, codes for shielding algorithms (e.g., transformation operator types K, N, O, S) and their parameters may configurable by an authorized user or administrator so that interpretation of keys may be different and unique to each IT solution. By assigning codes to algorithms and parameters, an administrator or a data owner may define proprietary mnemonic from the library of algorithms 430. Then, the transformation key generator 410 may generate for the IT solution, unique instances of the transformation knowledge key 120 for shielding the data 110.

In an implementation, the level of shielding protection of the data 110 may be further enhanced by adding a cryptographic hash type shielding algorithm 1020, a communication channel selection algorithm 1022, and/or a user configured shielding algorithm 1090 for ultimate control of generating shielded data that is suitable for storage in untrusted environments 150. An example of a user configured shielding algorithm 1090 may include configuring an N-dimensional matrix that has a user configured bit pattern for each of the matrix elements.

In an implementation, the encryption type algorithm 1050 is an Advanced Encryption Standard (AES), the AES using a symmetric key, where the encryption type algorithm 1050 independently controls a shielding factor by configuring the symmetric key having S-bits, S being a positive integer. In an implementation, the encryption type algorithm 1050 may use asymmetric keys, where the encryption type algorithm independently controls a shielding factor by configuring at least one of the asymmetric keys having A-bits, A being a positive integer. Other well-known encryption type algorithms (e.g., DES, RSA, HASH, MD5, AES, SHA-1, HMAC, and others) may be used.

In an implementation, the noise insertion type algorithm 1060 is configured to shield the data by inserting a noise pattern in the data in accordance with coded instructions included in the second component 520.

In an implementation, the noise pattern is configured to be one of a toggle pattern, a swap pattern, a rotation pattern, and a XOR pattern, each member of the noise pattern corresponding to a coded instruction.

In an implementation, the data splitting type algorithm 1070 is configured to split the data 110 into N segments of partially shielded data (432, 434). The splitting operation may be configured to be placed in any order in the configurable order, e.g., the third component may be selected in the configurable order to be different than the last, N being a positive integer.

In an implementation, the data byte reformatting type algorithm 1080 is configured to shield the data by changing data byte sequence in accordance with coded instructions in the transformation knowledge key 120, where the data byte reformatting type algorithm 1080 is selectable to be at least one of big-endian, small-endian, origin offset or any one of P-factorial permutations where P is an integer less than or equal to size of the data.

FIG. 10B illustrates in tabular form examples of shielding methods included in a library of shielding algorithms. In an implementation, Table T 1092 lists codes and parameters that may be selected for various shielding algorithms 1050, 1060, 1070 and 1080 (e.g., K, N, S, O transformation operator types). All parameters for K, N, O, S methods may be randomly selectable in bounded limits, e.g., may be based on a random number generator or a time of day based selection. Examples of sequence generation may include arithmetic progression, geometric progression, prime numbers, Fibonacci/Lucas sequence, Recaman's sequence, polygonal numbers (e.g., triangular, pentagonal, hexagonal and others), Morse code, and others. The sequence generation methods may be used for Noise insertion (N), Split segment (S) selection, Ordering (O) selection, or for other types of data transformations described herein.

Example Process for Shielding Data

Figure 11A:
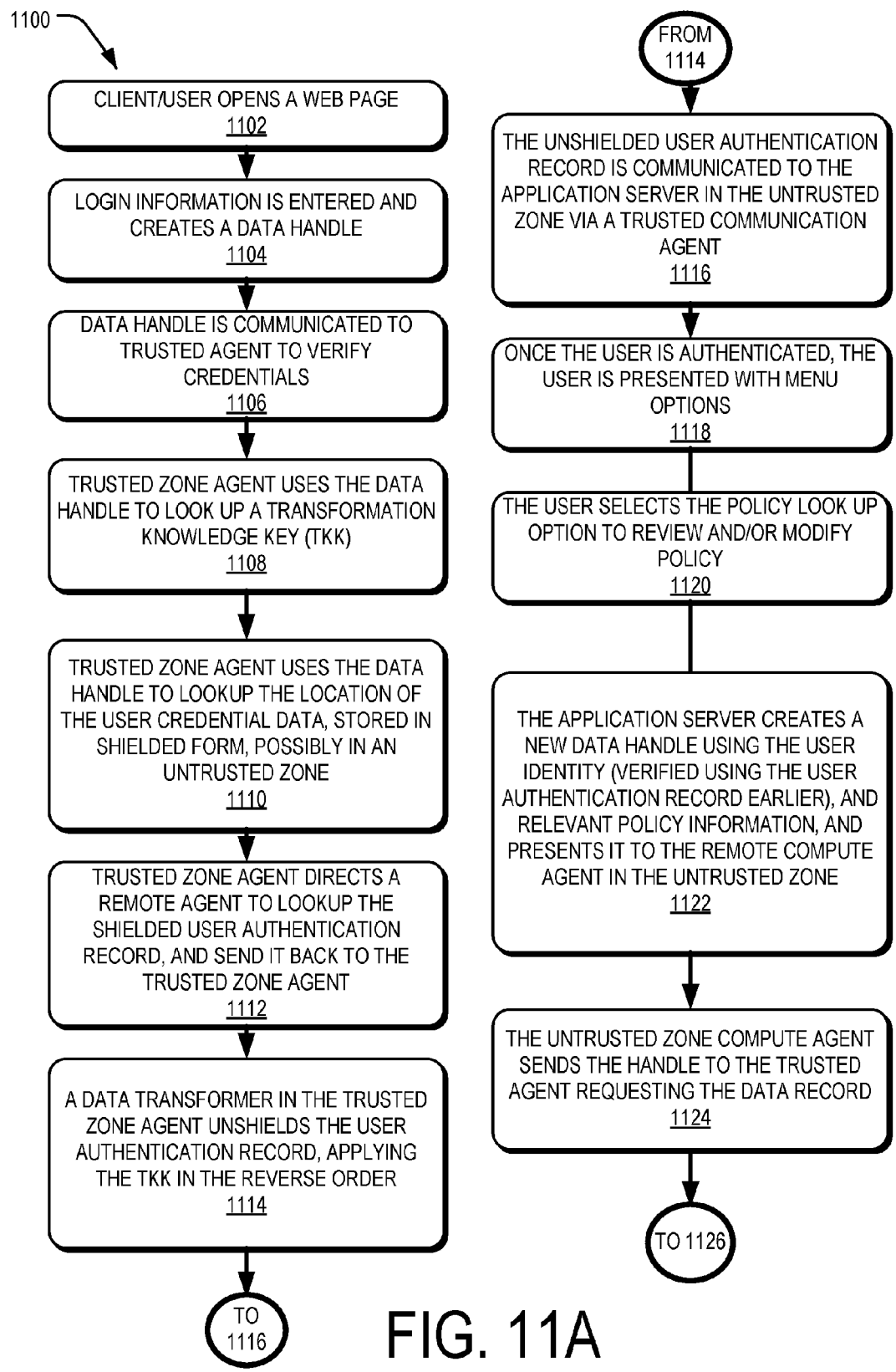
FIGS. 11A, 11B, and 11C are flow diagrams illustrating a process to implement the techniques described herein for shielding data.
Figure 11B:
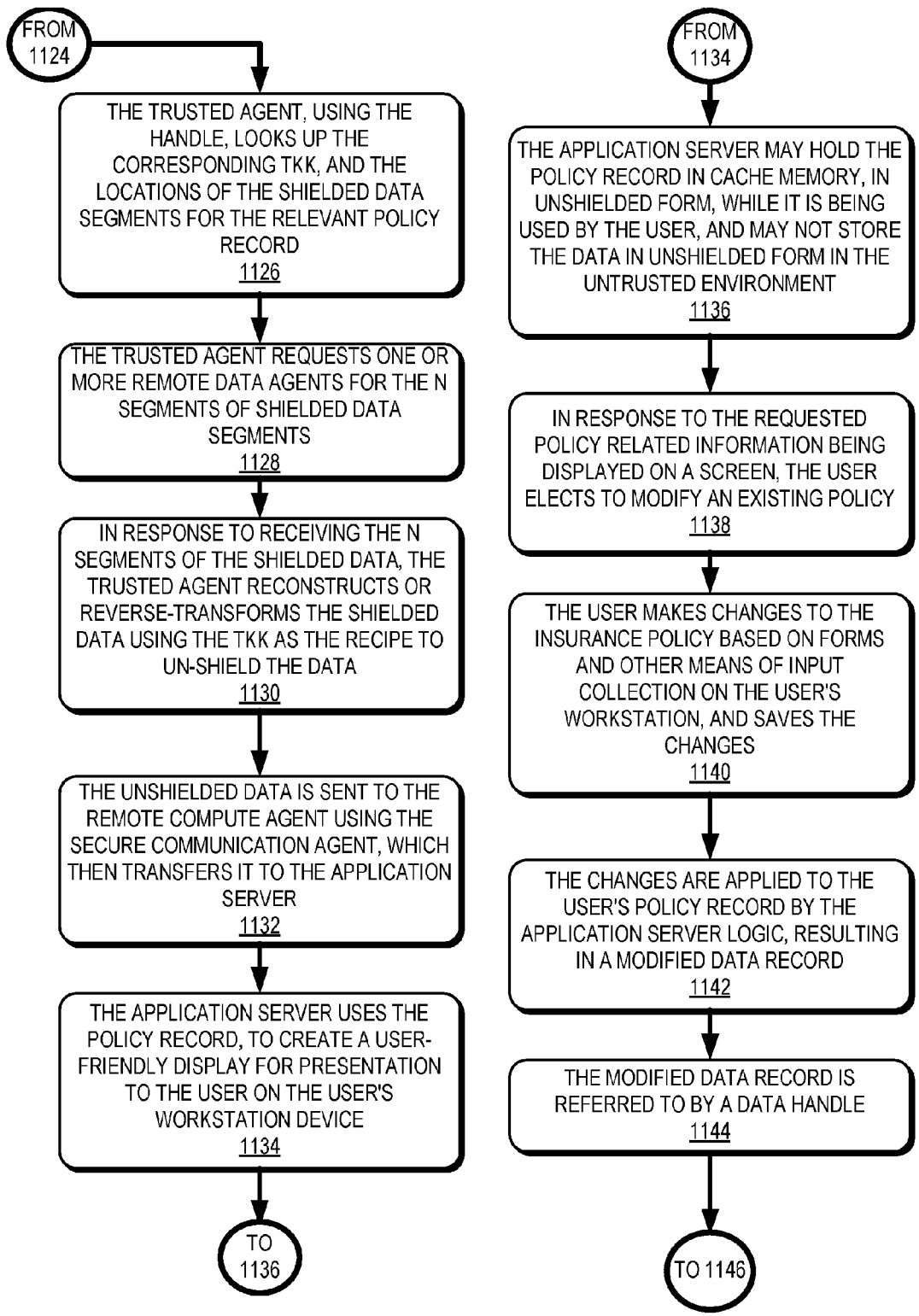
Figure 11C:
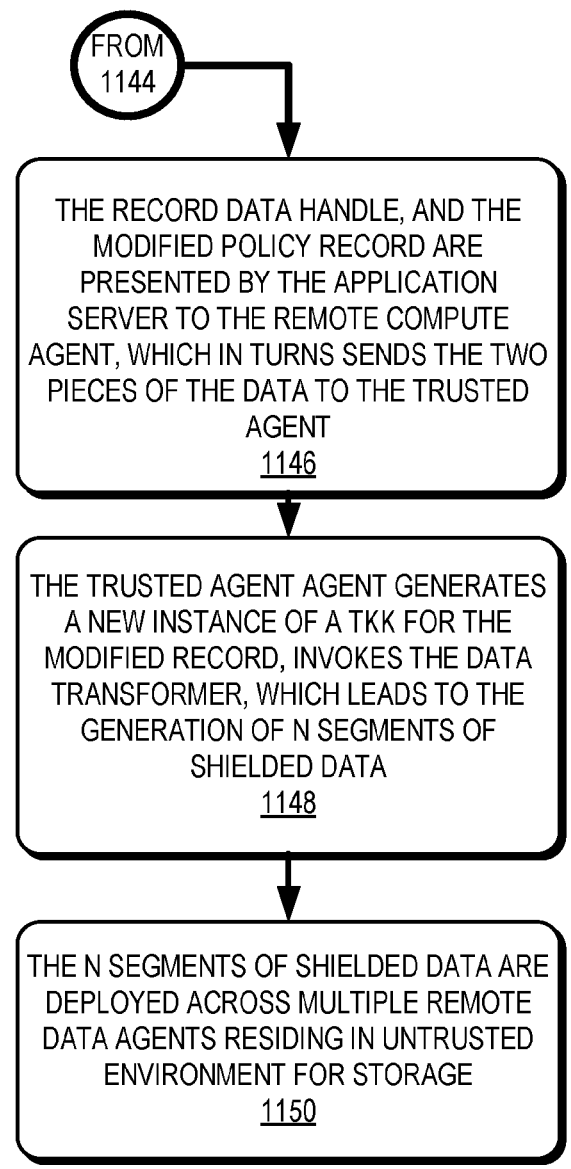

FIG. 11 is a flow diagram illustrating a process 1100 to implement the techniques described herein for shielding data. The process 1100 may be implemented, at least in part, by the systems 100, 200, 300, 400, 500, 600, 700, 800, 900, and 1000 as described with reference to FIGS. 1-10 and as described herein.

Referring back to FIG. 11, the process 1100 begins at operation 1102, where a client or a user opens a webpage to access the service(s) offered by an application that may be offered by an IT solution provider. As described earlier, the application may include financial applications (e.g., banks, credit cards, equity markets, and others), healthcare applications (patient records, insurance, providers, employers, and others), corporate applications (confidential financial, legal, product related data), government applications (taxes, social security, defense, homeland security), and personal data applications. For example, the user may request to access insurance policy information, and possibly make changes to an existing policy with an insurance provider. The webpage presents the user with a login & password prompt.

Next, at operation 1102, the user enters login information, e.g., user name and password. At operation 1104, an application server (e.g., the application server 240) uses the login name/password to create a data handle. At operation 1106, the application server presents the data handle to a remote agent (e.g., the remote compute agent 380), which communicates the handle to the trusted zone agent (e.g., the trusted agent 360) via a trusted communications agent (e.g., the communications agent 440), asking it to look up the user credentials. At operation 1108, the trusted zone agent uses the data handle to look up a corresponding transformation knowledge key (e.g., the transformation knowledge key 120) from its database. At operation 1110, the trusted zone agent uses the data handle to also lookup the location of the user credential data, stored in shielded form, possibly in an untrusted zone. At operation 1112, the trusted zone agent directs a remote agent residing in an untrusted zone (e.g., the remote compute agent 380) to lookup the shielded user authentication record, and sends it back to the trusted zone agent. At operation 1114, upon receiving the shielded user authentication record, a data transformer (e.g., the data transformer 420) in the trusted zone agent unshields the user authentication record, applying the transformation knowledge key in the reverse order. After applying all the reverse transformations, the unshielded user authentication record is controlled by the trusted agent and resides in the trusted environment.

Next, at operation 1116, the unshielded user authentication record is communicated to the application server in the untrusted zone via a trusted communication agent (e.g., the communications agent 440). In an implementation, the application server uses the unshielded user authentication record to authenticate the user, and promptly destroys all instances of the authentication record that may be stored in main memory, or cache, or any other storage device in the untrusted zone. At operation 1118, once the user is authenticated, the user is presented with menu options such as policy lookup, policy modify, policy cancellation, policy payment, and similar others. At operation 1120, the user selects the policy look up option to review and/or modify policy. At operation 1122, the application server creates a new data handle using the user identity (verified using the user authentication record earlier), and relevant policy information, and presents it to the remote compute agent in the untrusted zone.

Next, at operation 1124, the untrusted zone compute agent sends the handle to the trusted agent requesting the data record. At operation 1126, the trusted agent, using the handle, looks up the corresponding transformation knowledge key, and the locations of the shielded data segments for the relevant policy record. At operation 1128, as described in previous operations, the trusted agent requests one or more remote data agents for the N segments of shielded data segments. At operation 1130, in response to receiving the N segments of the shielded data, the trusted agent reconstructs or reverse-transforms the shielded data using the TKK as the recipe to un-shield the data. At operation 1132, the unshielded or reconstructed data (related to the insurance policy data requested by the user via the application server) is sent to the remote compute agent using the secure communication agent, which then transfers it to the application server. At operation 1134, the application server uses the policy record, to create a user-friendly display for presentation to the user on the user's workstation device.

Next, at operation 1136, the application server may hold the insurance policy record in cache memory, in unshielded form, while it is being used by the user, and may not store the data in unshielded form in the untrusted environment (e.g., after usage, the insurance policy record may be discarded). At operation 1138, in response to the requested policy related information being displayed on a screen, in an implementation, the user may elect to modify an existing policy. At operation 1138, in an implementation, the user makes changes to the insurance policy based on forms and other means of input collection on the user's workstation, and saves the changes. At operation 1140, the changes are applied to the user's policy record by the application server logic, resulting in a modified data record. At operation 1142, the modified data record is referred to by a data handle, which may be the same as the old data handle for the user's record, or in some implementations it may be a different data handle. However, the data handle is unique in the IT solution.

Next, at operation 1144, the record data handle, and the modified policy record are presented by the application server to the remote compute agent, which in turns sends the two pieces of the data to the trusted agent. At operation 1146, the trusted zone agent generates a new instance of a transformation knowledge key for the modified record, invokes the data transformer, which leads to the generation of N segments of shielded data. At operation 1148, the N segments of shielded data are deployed across multiple remote data agents residing in untrusted environment for storage.

The order in which any process or method described herein is not intended to be construed as a limitation, and any number of the described process blocks can be combined in any order to implement the process, method or alternate method. Additionally, individual blocks may be deleted from the process without departing from the spirit and scope of the subject matter described herein. Furthermore, the process may be implemented in any suitable hardware, software, firmware, or a combination thereof, without departing from the scope of the invention. For example, the process 1100 may be optimized further. The application server may be configured to invoke the remote agent directly with the data handle and look for the data requested (e.g., policy record). The remote agent may then consult with the trusted zone agent, using the data handle, and the two together in co-operation may present the data record to the application server.

Example Process for Storing Shielded Data

Figure 12:
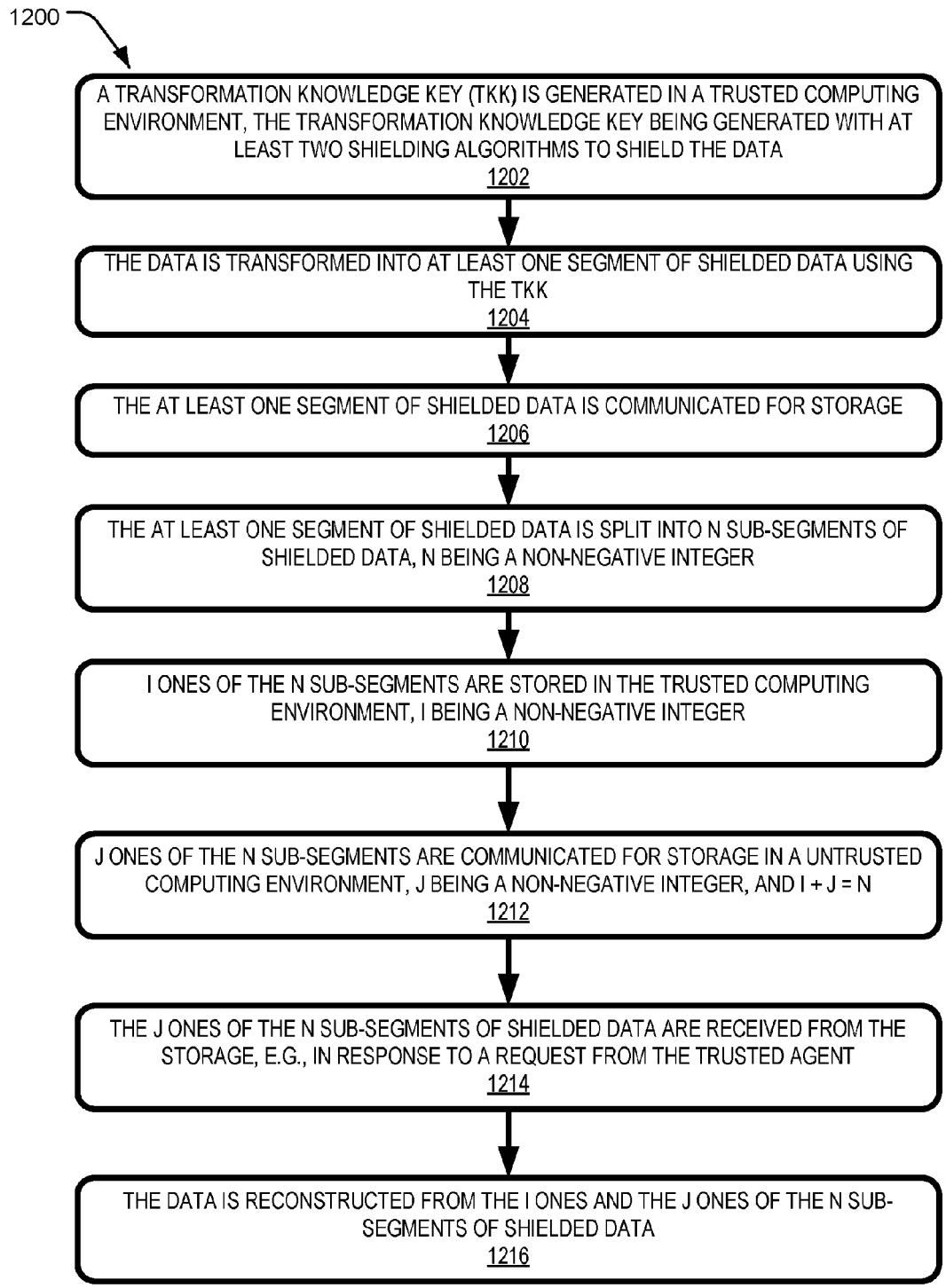
FIG. 12 is a flow diagram illustrating a process to implement the techniques described herein for storing shielded data.

FIG. 12 is a flow diagram illustrating a process 1200 to implement the techniques described herein for storing shielded data. The process 1200 may be implemented, at least in part, by the systems 100, 200, 300, 400, 500, 600, 700, 800, 900, and 1000 as described with reference to FIGS. 1-10 and as described herein.

Referring back to FIG. 12, the process 1200 begins at block 1202, where a transformation knowledge key is generated in a trusted computing environment, the transformation knowledge key being generated with at least two shielding algorithms to shield the data.

At block 1204, the data is transformed into at least one segment of shielded data using the transformation knowledge key. At block 1206, the at least one segment of shielded data is communicated for storage. At block 1208, the at least one segment of shielded data is split into N sub-segments of shielded data, N being a non-negative integer. At block 1210, I ones of the N sub-segments are stored in the trusted computing environment, I being a non-negative integer. At block 1212, J ones of the N sub-segments are communicated for storage in a untrusted computing environment, J being a non-negative integer, and I+J=N.

At block 1214, the J ones of the N sub-segments of shielded data are received from the storage, e.g., in response to a request from the trusted agent. At block 1216, the data is reconstructed from the I ones and the J ones of the N sub-segments of shielded data from the trusted locations and the untrusted locations respectively using the transformation knowledge key.

Example of a Computer System to Implement Data Shielding

Figure 13:
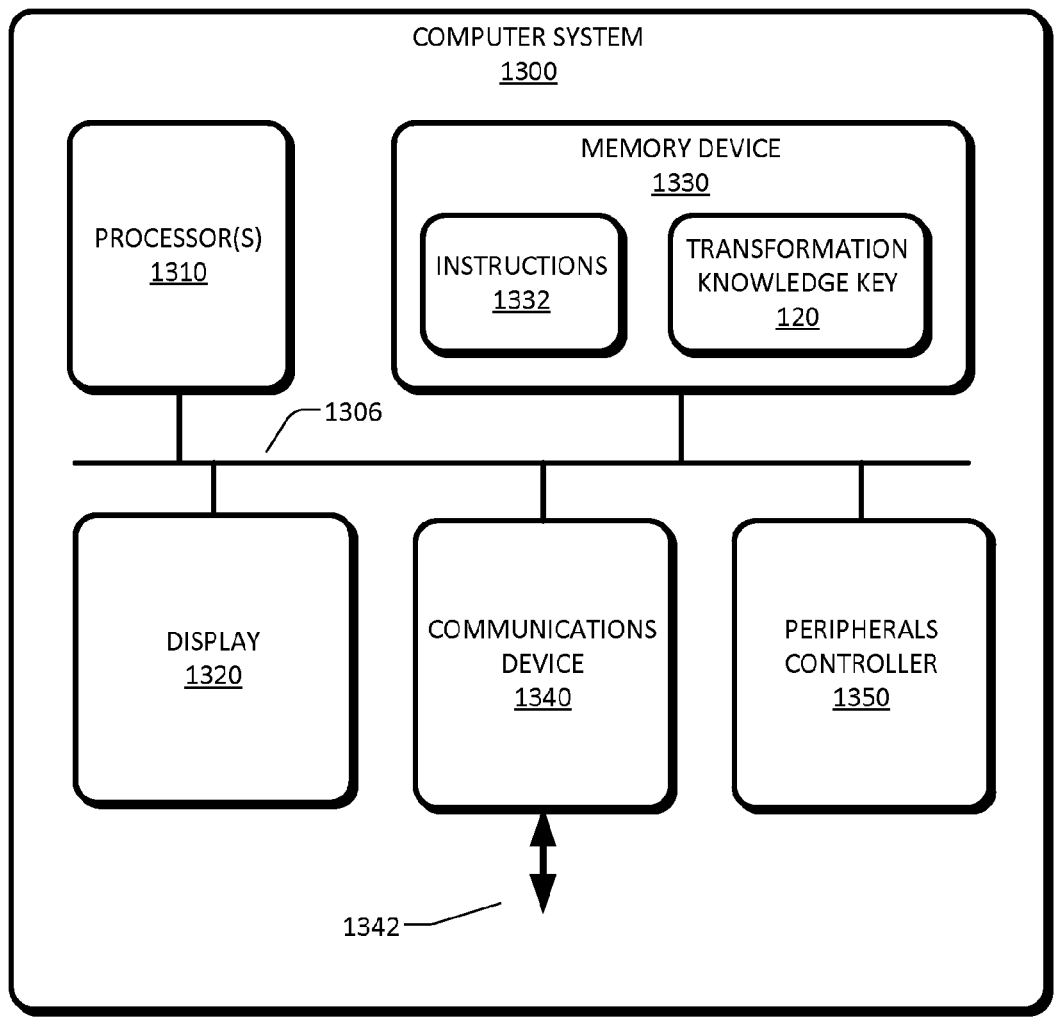
FIG. 13 is a block diagram of a computer system that is configured to shield data.

FIG. 13 is a block diagram of a computer system 1300 that is configured to shield data. More particularly, users may have a desire to shield data in unsecure environments to reduce costs and improve scalability. Examples of such computer systems that may be used to shield data may include, but are not limited to, servers, client devices, workstations, desktop devices, a tablet computer, a netbook, a notebook computer, a laptop computer, mobile phone, a cellular phone, a smartphone, a personal digital assistant, a multimedia playback device, a digital music player, a digital video player, a navigational device, a digital camera, a set top device, and the like. Any of these computer systems may be virtualized or may be bare-metal.

In an implementation, the computer system 1300, includes a processor 1310 coupled to a bus 1306, a memory device 1330 coupled to the processor via the bus 1306, a communications device 1340 coupled to the processor 1310 via the bus 1306, and a peripherals controller 1350 coupled to the processor 1310 via the bus 1306. The communications device 1340 is configured to communicate with other computer systems (not shown) via a communications link 1342.

A user interaction device may include a display 1320. The peripherals controller 1350 may be used to control peripherals such as a touch screen, a mouse, a trackball, or similar other cursor positioning devices, a hard disk storage device, and others. The display 1320 is configured to provide a graphical user interface for user interaction.

It should be understood that depending on the computing load, more than one processor 1310 may be included in the computer system 1300. The memory device 1330 is operable to store instructions or commands 1332 that are executable by the processor 1310 to perform one or more functions. It should also be understood that the term "computer system" is intended to encompass any device having a processor that is capable of executing program instructions from a memory medium. Various solutions, applications, functions, processes, method(s), programs, agents, and operations described herein may be implemented using the computer system 1300. Any system such as system 100, 200, 300, 400, 500, 600, 700, 800, 900, and 1000 or any processes or methods such as process 1100, 1200 as described herein may be implemented using the computer system 1300. For example, the processor 1310 is operable to execute the instructions 1332 stored in memory device 1330 for generating the transformation knowledge key 120.

The components of the computer system 1300 may be modules of computer-executable instructions, which are instructions executable on a computer, mobile device, or the processors of such devices. While shown here as agents, the components may be embodied as hardware, firmware, software, or any combination thereof. The techniques described herein may be performed, as a whole or in part, by hardware, software, firmware, or some combination thereof.

In various implementations the program instructions 1332 may be implemented in various ways, including procedure-based techniques, component-based techniques, object-oriented techniques, rule-based techniques, among others. The program instructions 1332 can be stored on the memory 1330 or any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The term "techniques," for instance, may refer to one or more devices, apparatuses, systems, methods, articles of manufacture, and/or computer-readable instructions as indicated by the context described herein. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form. Unless the context indicates otherwise, the term "logic" used herein includes hardware, software, firmware, circuitry, logic circuitry, integrated circuitry, other electronic components and/or a combination thereof that is suitable to perform the functions described for that logic.

Systems and methods described herein may include one or more IT solutions for shielding data that may be implemented in one or more trusted environments and/or in one or more untrusted environments. In some implementations, a single instance of the trusted and/or the remote agent may serve multiple IT solutions concurrently (referred to as a "federated" approach), thereby enabling one IT solution to talk to another IT solution. In some implementations, the trusted agent may be spread across single or multiple locations such that all the instances may operate in co-operation with each other. They may replicate each other's databases; assist in speeding up the processes of shielding and unshielding. They may act as backup agents to each other in order to provide high-availability & lower latency to the solution as a whole. Replicated trusted agent databases may be used in extraordinary circumstances, e.g., for data recovery in a disaster situation.

Systems and methods described herein provide extraordinary levels of data shielding to data that enables users to take advantage of significantly lower cost and improved scalability offered by Cloud based services without compromising on the integrity and confidentiality of the data stored in untrusted environments. Extraordinary results are derived from use of the following features that significantly improve data shielding and lower costs: (1) the order of performing data transformations may be determined in real-time. This makes it virtually impossible to reconstruct shielded data since the system is always dynamically altering the process to reconstruct the data, (2) algorithms are user-specified and encoded. This gives complete control to a user to protect proprietary data, (3) levels and types of algorithms used for data transformations are under the control of a user, (4) user maintains full control of distribution of the results of the transformations across multiple trusted and untrusted locations, (5) the transformation knowledge keys themselves may be shielded, (6) lack of a single segment of shielded data (which may be stored in a secured environment) will make extraordinarily difficult, if not practically impossible, to reconstruct the original data.

The systems and methods described herein provide extraordinary levels of data shielding to data by providing the data owner or administrator with the following control techniques: 1) credentials to access the trusted and untrusted computing environments, 2) knowledge about the location and identification for each segment of shielded data, 3) access to the transformation knowledge key and decoding of the transformation knowledge key, 4) knowledge about interpreting codes and parameters for the K, N, O, S transformation operator types, 5) knowledge about the data shielding algorithms (including proprietary ones) stored in the library of shielding algorithms, 6) knowledge about the data transformer operation including structure and sequence of processing K, N, O, S transformation operator types, and 7) knowledge about how to reconstruct the data from the N segments of shielded data that may be stored in the trusted as well as untrusted environments and the transformation knowledge key.

The following examples pertain to further embodiments. A method and system may include a trusted agent operable in a trusted computing environment. The trusted agent includes a transformation knowledge key generator and a data transformer. The transformation knowledge key generator is operable to generate a transformation knowledge key, the transformation knowledge key being generated with at least two shielding algorithms to shield the data. The data transformer is operable to transform the data into N segments of shielded data using the transformation knowledge key. A communications agent that is securely coupled to the trusted agent is operable to securely transfer one the N segments of shielded data to one or more storage devices in untrusted computing environments.

In certain implementations, at least one remote agent coupled to the trusted agent, the at least one remote agent operable in an untrusted computing environment, wherein the trusted agent is configured to store I ones of the N segments of shielded data in the trusted environment, wherein the at least one remote agent is configured to store J ones of the N segments of the shielded data in the untrusted environment, wherein I+J=N, and wherein I, and J are non-negative integers.

In certain implementations, the data transformer receives the J ones of the N segments of shielded data from the at least one remote agent in response to a request, wherein the data transformer reconstructs the data from I ones of the N segments of shielded data stored in the trusted environment and the J ones of the N segments of shielded data received from the at least one remote agent using the N instances of the transformation knowledge key.

In certain implementations, the at least one remote agent is configured as (N−I) remote agents coupled to the trusted agent, wherein the (N−I) remote agents are operable in (N−I) instances of the untrusted environment, wherein the J ones of the N segments of the shielded data are distributively stored in the (N−I) remote agents.

In certain implementations, I=1 and J=N−1, wherein (N−1) segments of shielded data are transferred to (N−1) remote agents.

In certain implementations, I=o and J=N, wherein the N segments of shielded data are transferred to N remote agents.

In certain implementations, the communications agent is operable to send to the at least one remote agent transformation logic data to interpret the transformation knowledge key and the transformation knowledge key.

In certain implementations, the at least one remote agent reconstructs the data from the N segments of shielded data using the transformation logic data and the transformation knowledge key In certain implementations, the trusted agent is configured to change the transformation logic data and the transformation knowledge key communicated to the at least one remote agent, the change being made in dependence of a transaction of the at least one remote agent.

In certain implementations, the trusted agent is configured to change the transformation logic data and the transformation knowledge key communicated to the at least one remote agent, the change being made in dependence of a configurable timer value.

In certain implementations, the data transformer is operable to split the data into N segments of partially shielded data and transform the N segments of the partially shielded data into the N segments of shielded data using the N instances of the transformation knowledge key.

In certain implementations, the at least one remote agent is configured as a storage agent, the storage agent being configured to access storage components using published application programming interfaces (API's) for the storage components.

In certain implementations, the at least one remote agent is configured as a compute agent, the compute agent being configured to communicate data associated with an application software program, the data being communicated to the trusted agent via a secure communications agent.

In certain implementations, the trusted computing environment is controlled by a trusted entity and the untrusted computing environment is controlled by a third party that is different than the trusted entity.

In certain implementations, the N instances of the transformation knowledge key are shielded and stored in the trusted computing environment.

In certain implementations, each one of the at least two shielding algorithms is configured to generate a data byte string, the transformation knowledge key being generated by concatenation of each one of the data byte string in a configurable order.

In certain implementations, the at least two shielding algorithms are configured by selecting codes representing at least two shielding algorithms selectable from a library of shielding algorithms, the data byte string being generated by concatenating the codes.

In certain implementations, a policy engine agent is configured to make a change in the trusted agent, the policy engine agent being operable to add a new shielding algorithm to the library of shielding algorithms, wherein the policy engine agent resides exclusively in the trusted environment.

In certain implementations, one of the at least two shielding algorithms is different than an encryption key type shielding algorithm.

In certain implementations, the transformation knowledge key is unique to each instance of the storage.

In certain implementations, the transformation knowledge key generator and all instances of the transformation knowledge key exclusively reside in the trusted environment.

In certain implementations, the communications agent is configured to select one or more simultaneous channels of communications from N channels of communications available to communicate any segment of the N segments of shielded data.

In certain implementations, a method of shielding data, the method comprising: generating a transformation knowledge key in a trusted computing environment, the transformation knowledge key being generated with at least two shielding algorithms to shield the data; transforming the data into the at least one segment of shielded data using the transformation knowledge key; and communicating the at least one segment of shielded data for storage.

In certain implementations, one or more computer-readable storage media storing instructions that, when executed by one or more processors, cause the one or more processors to perform acts comprising: generating a transformation knowledge key in the trusted computing environment, the transformation knowledge key being generated with at least two shielding algorithms to shield the data; transforming the data into at least one segment of shielded data using the transformation knowledge key; and communicating the at least one segment of shielded data for storage.

What is claimed is:

1. A system operable to shield data into shielded data, the system comprising:
    a hardware processor;
    logic instructions stored on computer readable storage media and executable by the hardware processor, the logic instructions being configured to include:
    a trusted agent operable in a trusted computing environment, wherein the trusted agent includes a transformation knowledge key generator and a data transformer,
    wherein the transformation knowledge key generator is operable to generate a transformation knowledge key, the transformation knowledge key being generated using at least two shielding algorithms to shield the data into the shielded data, wherein the transformation knowledge key is configured to include transformation expressions corresponding to each one of the at least two algorithms, wherein the transformation expressions are configured to include transformation operators, the transformation knowledge key being configurable to include a nested instance of another transformation operators corresponding to another transformation knowledge key,
    wherein the data transformer is operable to transform the data into N segments of the shielded data using corresponding N instances of the transformation knowledge key, N being a positive integer, wherein the trusted agent is configured to store the N instances of the transformation knowledge key and at least one segment of the N segments of the shielded data in the trusted computing environment; and
    a communications agent securely coupled to the trusted agent, the communications agent being operable to communicate the N segments of the shielded data for storage.

2. The system as recited in claim 1 further comprising:
    at least one remote agent coupled to the trusted agent, the at least one remote agent operable in an untrusted computing environment, wherein the trusted agent is configured to store I ones of the N segments of shielded data in the trusted environment, wherein the at least one remote agent is configured to store J ones of the N segments of the shielded data in the untrusted environment, wherein I+J=N, and wherein I, and J are non-negative integers, wherein the transformation operators includes a split data operator operable to split the shielded data into the I ones of the N segments of shielded data for storage in the trusted computing environment and the J ones of the N segments of the shielded data for storage in the untrusted computing environment, wherein the nested instance of the transformation knowledge key includes the split data operator.

3. The system as recited in claim 2, wherein the data transformer receives the J ones of the N segments of shielded data from the at least one remote agent in response to a request, wherein the data transformer reconstructs the data from I ones of the N segments of shielded data stored in the trusted environment and the J ones of the N segments of shielded data received from the at least one remote agent using the N instances of the transformation knowledge key.

4. The system as recited in claim 2, wherein the at least one remote agent is configured as (N−I) remote agents coupled to the trusted agent, wherein the (N−I) remote agents are operable in (N−I) instances of the untrusted environment, wherein the J ones of the N segments of the shielded data are distributively stored in the (N−I) remote agents.

5. The system as recited in claim 4, wherein I=1 and J=N−1, wherein (N−1) segments of shielded data are transferred to (N−1) remote agents.

6. The system as recited in claim 2, wherein the communications agent is operable to send to the at least one remote agent transformation logic data to interpret the transformation knowledge key and the transformation knowledge key.

7. The system as recited in claim 6, wherein the at least one remote agent reconstructs the data from the N segments of shielded data using the transformation logic data and the transformation knowledge key.

8. The system as recited in claim 6, wherein the trusted agent is configured to change the transformation logic data and the transformation knowledge key communicated to the at least one remote agent, the change being made in dependence of a transaction of the at least one remote agent.

9. The system as recited in claim 6, wherein the trusted agent is configured to change the transformation logic data and the transformation knowledge key communicated to the at least one remote agent, the change being made in dependence of a configurable timer value.

10. The system as recited in claim 1, wherein the data transformer is operable to split the data into N segments of partially shielded data and transform the N segments of the partially shielded data into the N segments of shielded data using the N instances of the transformation knowledge key.

11. The system as recited in claim 2, wherein the at least one remote agent is configured as a storage agent, the storage agent being configured to access storage components using published application programming interfaces (API's) for the storage components.

12. The system as recited in claim 2, wherein the at least one remote agent is configured as a compute agent, the compute agent being configured to communicate data associated with an application software program, the data being communicated to the trusted agent via a secure communications agent.

13. The system as recited in claim 2, wherein the trusted computing environment is controlled by a trusted entity and the untrusted computing environment is controlled by a third party that is different than the trusted entity.

14. The system as recited in claim 2, wherein the N instances of the transformation knowledge key are shielded and stored in the trusted computing environment.

15. The system as recited in claim 1, wherein each one of the at least two shielding algorithms is configured to generate a data byte string, the transformation knowledge key being generated by concatenation of each one of the data byte string in a configurable order.

16. The system as recited in claim 15, wherein the at least two shielding algorithms are configured by selecting codes representing at least two shielding algorithms selectable from a library of shielding algorithms, the data byte string being generated by concatenating the codes.

17. The system as recited in claim 16, wherein a policy engine agent is configured to make a change in the trusted agent, the policy engine agent being operable to add a new shielding algorithm to the library of shielding algorithms, wherein the policy engine agent resides exclusively in the trusted environment.

18. The system as recited in claim 1, wherein one of the at least two shielding algorithms is different than an encryption key type shielding algorithm.

19. The system as recited in claim 1, wherein the transformation knowledge key is unique to each instance of the storage.

20. The system as recited in claim 19, wherein the transformation knowledge key generator and all instances of the transformation knowledge key exclusively reside in the trusted environment.

21. The system as recited in claim 1, wherein the communications agent is configured to select one or more simultaneous channels of communications from N channels of communications available to communicate any segment of the N segments of shielded data.

22. A method of shielding data, the method comprising:
generating a transformation knowledge key in a trusted computing environment, the transformation knowledge key being generated with at least two shielding algorithms to shield the data, wherein the transformation knowledge key is configured to include transformation expressions corresponding to each one of the at least two algorithms, wherein the transformation expressions are configured to include transformation operators, the transformation knowledge key being configurable to include a nested instance of another transformation operators corresponding to another transformation knowledge key;
transforming the data into N segments of the shielded data using corresponding N instances of the transformation knowledge key, N being a positive integer, wherein the trusted agent is configured to store the N instances of the transformation knowledge key and at least one segment of the N segments of the shielded data in the trusted computing environment; and
communicating the at least one segment of shielded data for storage, wherein at least one of the generating, transforming and communicating steps is implemented by a computer processor.

23. The method as recited in claim 22, further comprising:
receiving the at least one segment of shielded data from the storage;
reconstructing the data from the at least one segment of shielded data using the transformation knowledge key.

24. The method as recited in claim 22, wherein the transforming further comprises:
splitting the at least one segment of shielded data into N sub-segments of shielded data;
storing I ones of the N sub-segments in the trusted environment;
communicating J ones of the N sub-segments of shielded data for storage in an untrusted environment, wherein I+J=N, wherein I, J and N are non-negative integers;
receiving the J ones of the N sub-segments of shielded data from the untrusted locations in response to a request; and
reconstructing the data from the I ones and the J ones of the N sub-segments of shielded data from the trusted locations and the untrusted locations respectively using the transformation knowledge key.

25. The method as recited in claim 22, wherein the transforming further comprises:
splitting the data into N sub-segments of data using the transformation knowledge key;
transforming the N sub-segments of data into corresponding N sub-segments of shielded data using the transformation knowledge key;
storing I ones of the N sub-segments of shielded data in the trusted environment;
communicating J ones of the N sub-segments of shielded data for storage in an untrusted environment, wherein I+J=N, wherein I, J and N are non-negative integers;
receiving the J ones of the N sub-segments of shielded data from the storage in the untrusted environment in response to a request; and
reconstructing the data from the from the I ones and the J ones of the N sub-segments of shielded data from the trusted locations and the untrusted locations respectively using the transformation knowledge key.

26. The method as recited in claim 22, further comprising:
configuring each one of the at least two shielding algorithms to generate a data byte string;
concatenating each one of the data byte string in a configurable sequence to generate the transformation knowledge key.

27. One or more non-transitory computer-readable storage media storing instructions that, when executed by one or more processors, cause the one or more processors to perform acts comprising:
generating a transformation knowledge key in the trusted computing environment, the transformation knowledge key being generated with at least two shielding algorithms to shield the data, wherein the transformation knowledge key is configured to include transformation expressions corresponding to each one of the at least two algorithms, wherein the transformation expressions are configured to include transformation operators, the transformation knowledge key being configurable to include a nested instance of another transformation operators corresponding to another transformation knowledge key;

transforming the data into N segments of the shielded data using corresponding N instances of the transformation knowledge key, N being a positive integer, wherein the trusted agent is configured to store the N instances of the transformation knowledge key and at least one segment of the N segments of the shielded data in the trusted computing environment; and communicating the at least one segment of shielded data for storage.

28. The system as recited in claim 1, wherein the transformation knowledge key is an ordered sequence of operations that are progressively performed by the data transformer for shielding the data into the shielded data.

29. The system as recited in claim 28, wherein the ordered sequence of operations is dynamically generated by the data transformer in real-time to include the nested instance.

30. The system as recited in claim 16, wherein the configurable order is dynamically generated by the transformation knowledge key generator in real-time.

31. The system as recited in claim 16, wherein the data transformer is configured to process the codes making up the transformation knowledge key in an order that is reverse of the configurable order to reconstruct the data from the N segments of the shielded data.

32. The system as recited in claim 16, wherein the transformation knowledge key generator is configurable to generate permutations of the codes in real-time.

33. The system as recited in claim 3, wherein the reconstruction of the data from the shielded data is virtually impossible in absence of any segment of the shielded data from the N segments of the shielded data.

34. The system as recited in claim 3, wherein the reconstruction of the data from the shielded data is virtually impossible in absence of a corresponding one of the N instances of the transformation knowledge key.

35. The system as recited in claim 16, wherein the nested instance is included in the transformation knowledge key in response to a selection of the at least two shielding algorithms from the library of shielding algorithms.

36. The system as recited in claim 35, wherein the selection includes a data splitting type algorithm.

37. The system as recited in claim 16, wherein the another transformation knowledge key is configured to include the at least two shielding algorithms.

38. The system as recited in claim 16, wherein the another transformation knowledge key is configured to include a different set of the at least two shielding algorithms from the library of shielding algorithms.

* * * * *